US010768268B2

(12) United States Patent
Baek et al.

(10) Patent No.: US 10,768,268 B2
(45) Date of Patent: Sep. 8, 2020

(54) APPARATUS AND METHOD FOR DETERMINING PROPERTIES OF CHANNEL

(71) Applicant: Samsung Electronics Co., Ltd., Suwon-si, Gyeonggi-do (KR)

(72) Inventors: Sangkyu Baek, Yongin-si (KR); Youngbin Chang, Anyang-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 372 days.

(21) Appl. No.: 15/412,736

(22) Filed: Jan. 23, 2017

(65) Prior Publication Data
US 2017/0212208 A1    Jul. 27, 2017

(30) Foreign Application Priority Data

Jan. 25, 2016    (KR) .................... 10-2016-0008819

(51) Int. Cl.
| | | |
|---|---|---|
| *H04B 1/00* | (2006.01) | |
| *G01S 5/02* | (2010.01) | |
| *H04B 17/309* | (2015.01) | |
| *H04B 17/318* | (2015.01) | |
| *H04B 17/27* | (2015.01) | |

(52) U.S. Cl.
CPC .......... *G01S 5/0273* (2013.01); *G01S 5/0215* (2013.01); *G01S 5/0252* (2013.01); *H04B 17/309* (2015.01); *H04B 17/27* (2015.01); *H04B 17/318* (2015.01)

(58) Field of Classification Search
CPC ...... H04B 17/20; H04B 17/27; H04B 17/309; H04B 17/318; G01S 5/0215; G01S 5/0252; G01S 5/0273; G01S 7/4021
See application file for complete search history.

(56) References Cited

U.S. PATENT DOCUMENTS

| | | | | |
|---|---|---|---|---|
| 9,971,016 | B2* | 5/2018 | Kwak | ........................ G01S 1/08 |
| 2001/0027110 | A1* | 10/2001 | Tekinay | .................... H04B 7/01 |
| | | | | 455/506 |
| 2015/0380816 | A1* | 12/2015 | Tajika | .................. H01Q 1/1271 |
| | | | | 370/315 |

(Continued)

FOREIGN PATENT DOCUMENTS

| | | |
|---|---|---|
| KR | 10-1051906 B1 | 7/2011 |
| WO | 2008/017033 A2 | 2/2008 |

OTHER PUBLICATIONS

Son et al., Location Information Reliability-Based Precision Locating System Using Nlos Condition Estimation, 13-38C-01-10, The Journal of Korean Institute of Communications and Information Sciences, 2013, pp. 97-108, vol. 38C No. 01.

(Continued)

*Primary Examiner* — Nhan T Le
(74) *Attorney, Agent, or Firm* — Jefferson IP Law, LLP

(57) ABSTRACT

The present disclosure relates to a fifth-generation (5G) or pre-5G communication system to support a higher data transmission rate, following a fourth-generation (4G) communication system including long term evolution (LTE). A method for operating an electronic device is provided. The method includes determining the properties of a first signal and a second signal that are transmitted through different frequency bands and performing line-of-sight (LoS) determination based on the determined properties of the first signal and the second signal.

17 Claims, 16 Drawing Sheets

(56) References Cited

U.S. PATENT DOCUMENTS

2016/0065435 A1\* 3/2016 Ito .................... H04L 43/0864
 375/358
2017/0094640 A1\* 3/2017 Jeong .................. H04W 72/02

OTHER PUBLICATIONS

Zhang et al., Analysis of Kurtosis-Based LOS/NLOS Identification Using Indoor Mimo Channel Measurement, IEEE Transactions on Vehicular Technology, Jul. 2013, pp. 2871-2874, vol. 62, No. 6.
Rappaport et al., State of the Art in 60-GHz Integrated Circuits and Systems for Wireless Communications, Proceedings of the IEEE, Aug. 2011, pp. 1390-1436, vol. 99, No. 8.
Qingling et al., Rain Attenuation in Millimeter Wave Ranges, Oct. 2006.

\* cited by examiner

APPARATUS AND METHOD FOR DETERMINING PROPERTIES OF CHANNEL

CROSS-REFERENCE TO RELATED APPLICATION(S)

This application claims the benefit under 35 U.S.C. § 119(a) of a Korean patent application filed on Jan. 25, 2016 in the Korean Intellectual Property Office and assigned Serial number 10-2016-0008819, the entire disclosure of which is hereby incorporated by reference.

TECHNICAL FIELD

The present disclosure relates to an apparatus and a method for determining the properties of a channel.

BACKGROUND

In order to meet the demand for wireless data traffic, which has been increasing since the commercialization of a fourth-generation (4G) communication system, efforts are being made to develop an improved fifth-generation (5G) communication system or pre-5G communication system. For this reason, a 5G communication system or pre-5G communication system is referred to as a beyond 4G network communication system or post long term evolution (LTE) system.

To achieve a high data transmission rate, implementing a 5G communication system in an extremely high frequency (mmWave) band (for example, 28 GHz, 38 GHz, and 60 GHz bands) is considered. To relieve the path loss of signals and to increase the transmission distance of signals in an extremely high frequency band, beamforming, massive multiple-input and multiple-output (massive MIMO), full dimensional MIMO (FD-MIMO), array antenna, analog beamforming, and large scale antenna techniques are under discussion for a 5G communication system.

Further, to improve the network of the system, technical development in an evolved small cell, an advanced small cell, a cloud radio access network (RAN), an ultra-dense network, device to device (D2D) communication, wireless backhaul, a moving network, cooperative communication, coordinated multi-points (CoMP), and interference cancellation is progressing for the 5G communication system.

In addition, an advanced coding modulation (ACM) scheme including hybrid frequency shift keying and quadrature amplitude modulation (FQAM) and sliding window superposition coding (SWSC) and an advanced access technique including filter bank multi carrier (FBMC), non orthogonal multiple access (NOMA), and sparse code multiple access (SCMA) are developing in the 5G system.

In prior art, a channel impulse response (CIR) statistical value is used to perform line-of-sight (LoS) determination. Here, Kurtosis, mean excess delay, and root-mean-squared (RMS) delay spread are used as a statistical value, and these values are measured and used for LoS measurement. There are a relatively large number of sections in which it is difficult to accurately determine LoS and non-line-of-sight (NLoS) using LoS determination based on such a statistical method. Thus, the accuracy of determination is low in regions having the values of such sections. Accordingly, the accuracy of LoS determination is excellent in a specific region, while the accuracy of LoS determination may be low in another region. When LoS and NLoS, which are not determined, are used for distance estimation and position estimation, spots having the same signal strength or signal transmission time are distributed in a wide distance to increase an error. Further, when accurate LoS determination is performed, LoS and NLoS optimized system setting values may be used to optimize performance.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an apparatus and a method for determining a channel property in a wireless communication system.

Another aspect of the present disclosure is to provide an apparatus and a method for performing line-of-sight (LoS) or non-line-of-sight (NLoS) determination in a wireless communication system.

Another aspect of the present disclosure is to provide an apparatus and a method for performing communication using two or more frequency bands to perform LoS or NLoS determination in a wireless communication system.

Another aspect of the present disclosure is to provide an apparatus and a method for performing LoS or NLoS determination based on signal strength in a wireless communication system.

Still another aspect of the present disclosure is to provide an apparatus and a method for performing LoS or NLoS determination based on the traveling time of a signal in a wireless communication system.

Still another aspect of the present disclosure is to provide an apparatus and a method for performing LoS or NLoS determination based on the traveling distance of a signal in a wireless communication system.

Still another aspect of the present disclosure is to provide an apparatus and a method for determining the traveling distance of a signal based on the traveling path of the signal in a wireless communication system.

Still another aspect of the present disclosure is to provide an apparatus and a method for determining the traveling distance of a signal based on the strength of the signal in a wireless communication system.

Still another aspect of the present disclosure is to provide an apparatus and a method for performing LoS or NLoS determination based on the directions of transmitted and received beams of a signal in a wireless communication system.

Still another aspect of the present disclosure is to provide an apparatus and a method for performing LoS or NLoS determination based on an optimal beam direction in a wireless communication system.

Still another aspect of the present disclosure is to provide an apparatus and a method for transmitting and receiving necessary information to perform LoS or NLoS determination in a wireless communication system.

In accordance with an aspect of the present disclosure, a method for operating an electronic device is provided. The operating method includes determining properties of a first signal and a second signal that are transmitted through different frequency bands and performing LoS determination based on the properties of the first signal and the second signal.

In accordance with another aspect of the present disclosure, an electronic device is provided. The electronic device includes a wireless communication transceiver and at least one processor configured to determine properties of a first signal and a second signal that are transmitted through different frequency bands and to perform LoS determination based on the properties of the first signal and the second signal.

It is possible to determine whether a LoS area is present between a transmitting point and a receiving point.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
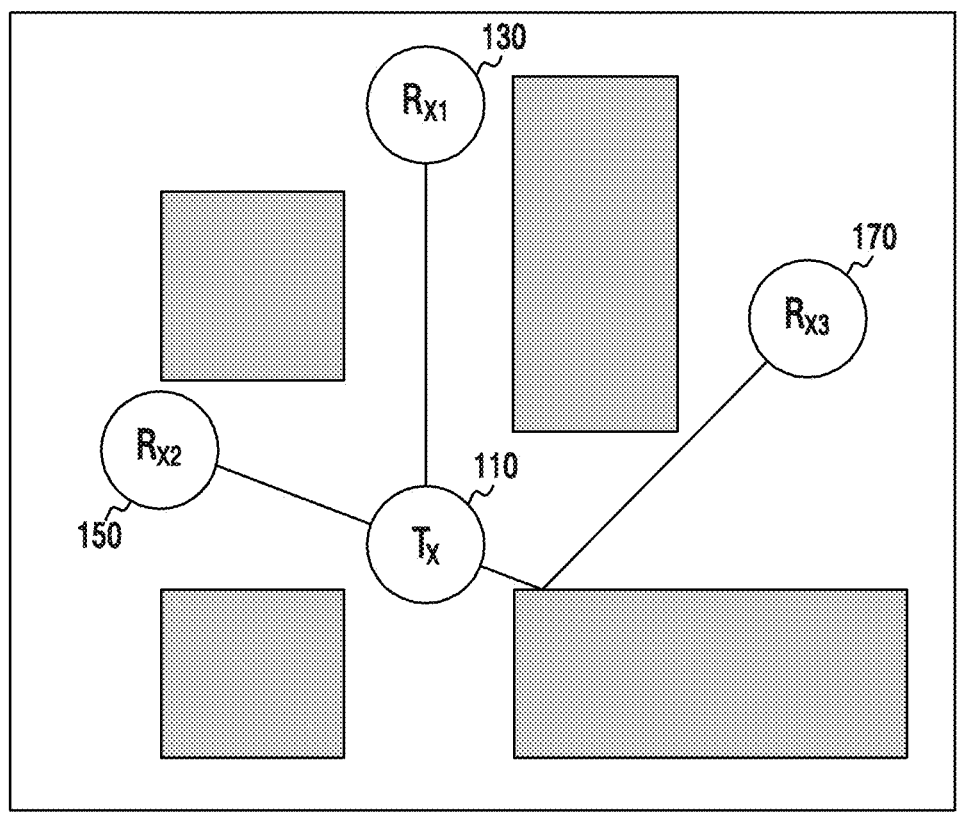
FIG. 1 illustrates a wireless communication environment according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Hereinafter, the present disclosure provides an apparatus and a method for determining a channel property through the measurement of a signal transmitted or received in a wireless communication system. Here, the channel property may include at least one of line-of-sight (LoS) and non-line-of-sight (NLoS). In the following description, a term used to refer to control information, terms used to refer to network entities, terms used to refer to messages, and a term used to refer to a component of a device are illustrated for the convenience of description. Therefore, the present disclosure is not limited by the following terms, which may be replaced with other terms having technically equivalent meanings.

The present disclosure includes a transmission device and a reception device for wireless communication. Wireless communication methods of the present disclosure include: existing communication methods, such as a cellular communication network including wideband code division multiple access (WCDMA), long term evolution (LTE) and LTE-Advanced (LTE-A), a wireless local area network (LAN) including Wi-Fi, Bluetooth, and other communication methods; and new communication methods. Therefore, the wireless communication methods of the present disclosure are not limited, and it is possible to apply the technique of the present disclosure as long as wireless communication is enabled between the transmission device and the reception device. According to an embodiment, the transmission device may be a base station of a mobile communication system, and the reception device may be a terminal of the mobile communication system. On the contrary, according to another embodiment, the transmission device may be a terminal of a mobile communication system, and the reception device may be a base station of the mobile communication system. A base station and a terminal may be referred to as an electronic device in the present disclosure.

According to an embodiment, the transmission device and the reception device may operate in two or more frequency bands, which may be achieved by including a communication chip corresponding to two or more frequency bands in one transmission device or reception device. In the present disclosure, for convenience, a band occupying low frequencies of the two frequency bands is defined as a low frequency, and a band occupying high frequencies is defined as a high frequency. In an embodiment, a low frequency band may be a 3rd generation partnership project (3GPP) LTE communication frequency band, and a high frequency band may be an extremely high frequency of 10 GHz or higher or—may be a millimeter wave band. In another embodiment, a low frequency band may be a 2.4. GHz industrial scientific medical (ISM) band, and a high frequency band may be a 60 GHz ISM band. However, a low frequency band and a high frequency band are not limited in the present disclosure.

For line-of-sight (LoS) determination, the transmission device and the reception device may use a specific signal used for signal measurement. Here, signal measurement may include the measurement of signal strength, the measurement of signal transmission distance, the measurement of signal transmission time, the measurement of a signal transmission direction, or the like. The specific signal may be a signal for signal measurement that is used in an existing communication system or may be a newly defined signal. For example, the specific signal may be one of a cell-specific reference signal (CRS) defined in LTE, a dedicated RS (DRS), a demodulation RS (DM-RS), and a sounding RS (SRS). In a wireless LAN, a beacon signal, a request to send (RTS), and a clear to send (CTS) may be used as the specific signal. When beamforming is performed, the specific signal may be a beam measurement RS (BMRS) for beam measurement, a beam RS (BRS), a beam refinement RS (BMRS), or the like. However, the present disclosure does not limit a signal used for measurement.

According to various embodiments, the transmission device or the reception device may perform beamforming. As a beamforming method is not limited in the present disclosure, the transmission device or the reception device may use analog beamforming, digital beamforming, and hybrid beamforming methods.

FIG. 1 illustrates a wireless communication environment according to an embodiment of the present disclosure.

For example, referring to FIG. 1, the wireless communication environment includes one transmission device 110 and three reception devices (for example, a reception device 130, a reception device 150, and a reception device 170) in a specific area. However, this example is not construed as limiting an embodiment, and a random number of reception devices and a random number of transmission devices may be applied in various embodiments. Further, the transmission device may perform not only a signal transmitting function but also a signal receiving function, and the reception devices may also perform not only a signal receiving function but also a signal transmitting function. The transmission device and the reception devices may be a base station and terminals, respectively. Also, the transmission device or the reception device may be referred to as an electronic device.

Referring to FIG. 1, the reception device 130 and the reception device 150 are located in a LoS area in a relationship with the transmission device 110. However, the reception device 170 is located in a non-line-of-sight (NLoS) area, not in the LoS area, in a relationship with the transmission device 110. However, a technique of the related art has low accuracy in determining whether a reception device is located in a LoS area.

Therefore, a method is required to increase accuracy in determining the NLoS or LoS of reception devices. When a generally used statistical method is employed, accuracy in NLoS or LoS determination may be low in areas. In the present disclosure, the transmission device transmits signals in two or more frequency bands, and the reception devices may receive the signals in the two or more frequency bands. The transmission device or the reception devices may perform LoS determination through the measurement of each signal at each frequency. Here, signal measurement may include the measurement of signal strength, the measurement of signal transmission distance, the measurement of signal transmission time, the measurement of a signal transmission direction, or the like. A specific signal may be a signal for signal measurement that is used in an existing communication system or may be a newly defined signal.

Hereinafter, for the convenience of description, a transmission device or reception device for LoS determination is referred to as an electronic device in the present disclosure.

Figure 2:
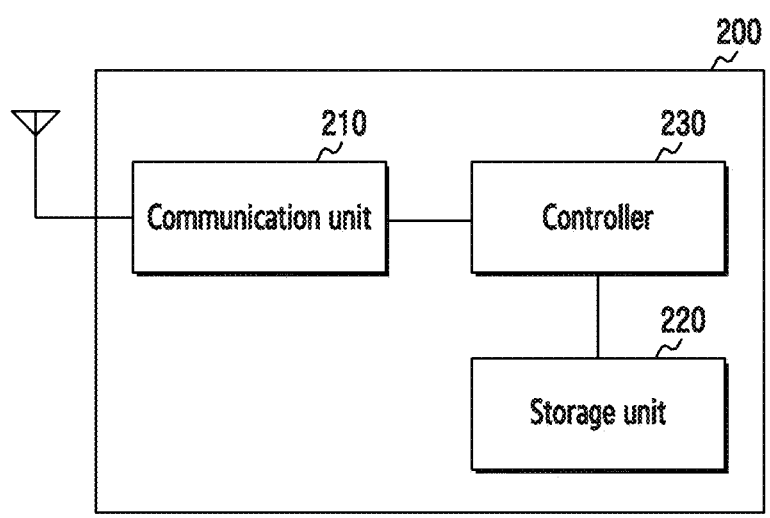
FIG. 2 is a block diagram of an electronic device according to an embodiment of the present disclosure.

FIG. 2 is a block diagram of an electronic device according to an embodiment of the present disclosure. The term "unit" used herein indicate a unit for processing at least one function or operation, which may be implemented by hardware, software, or a combination thereof.

Referring to FIG. 2, the electronic device 200 includes a communication unit 210, a storage unit 220, and a controller 230.

The communication unit 210 performs functions of transmitting and receiving a signal through a wireless channel. For example, the communication unit 210 may perform a function of converting between a baseband signal and a bitstream according to a physical layer standard of a system. For example, in data transmission, the communication unit 210 encodes and modulates a transmitted bitstream to generate complex symbols. Further, in data reception, the communication unit 210 demodulates and decodes a baseband signal to reconstruct a received bitstream. In addition, the communication unit 210 up-converts a baseband signal to a radio frequency (RF) signal and transmits the RF signal through an antenna and down-converts a RF signal, which is received through the antenna, to a baseband signal. The communication unit 210 may include, for example, a transmission filter, a reception filter, an amplifier, a mixer, an oscillator, a digital-to-analog converter (DAC), an analog-to-digital converter (ADC), or the like.

Further, the communication unit 210 may include a plurality of RF chains. According to the present disclosure, the communication unit 210 may transmit and receive a high frequency signal and a low frequency signal through the plurality of RF chains. Furthermore, the communication unit 210 may perform beamforming. For beamforming, the communication unit 210 may adjust the phase and strength of each of signals transmitted and received through a plurality of antennas or antenna elements. In addition, the communication unit 210 may include a plurality of communication modules to support a plurality of different radio access technologies.

Further, the communication unit 210 may include different communication modules to process signals in different frequency bands. For example, different communication standards may include Bluetooth low energy (BLE), Wi-Fi, Wi-Fi gigabyte (WiGig), a cellular network (for example, LTE, LTE-A, and a next-generation mobile communication network), or the like. The different frequency bands may include a super high frequency (SHF, for example, 2.5 GHz and 5 GHz) band and a millimeter wave (for example, 28 GHz, 38 GHz, and 60 GHz) band.

The communication unit 210 transmits and receives a signal as described above. Accordingly, the communication unit 210 may be referred to as a transmitter, a receiver, or a transceiver. Further, in the following description, transmission and reception performed through a wireless channel may be used to indicate the foregoing processing performed by the communication unit 210.

The storage unit 220 stores data, such as a basic program, an application, and configuration information, for an operation of the electronic device 200. The storage unit 220 may be configured as a volatile memory, a nonvolatile memory, or a combination of a volatile memory and a nonvolatile memory. In particular, the storage unit 220 may store information necessary for signal measurement. Here, signal measurement may include the measurement of a signal traveling path, the measurement of signal strength, the measurement of signal traveling time, and the measurement of signal transmitting and receiving directions, and the storage unit 220 may store information necessary for signal measurement. The storage unit 220 may provide stored data according to a request from the controller 230.

The controller 230 controls overall operations of the electronic device 200. For example, the controller 230 transmits and receives a signal through the communication unit 210. Further, the controller 230 records and reads data in the storage unit 220. To this end, the controller 230 may include at least one processor or microprocessor, or may be part of a processor. Further, part of the communication unit 210 and the controller 230 may be referred to as a communication processor (CP). In particular, the controller 230 controls the electronic device 200 to measure a signal according to various embodiments to be described. The controller 230 controls the electronic device 200 to perform LoS determination using a signal measurement result. For example, the controller 230 may control the electronic device 200 to perform procedures illustrated below in FIGS. 3, 4A, 4B, 5A, 5B, 6 to 11, 12A, 12B, 13, 14A, 14B, 15A, 15B, 16A, 16B, 16C, and 16D.

Figure 3:
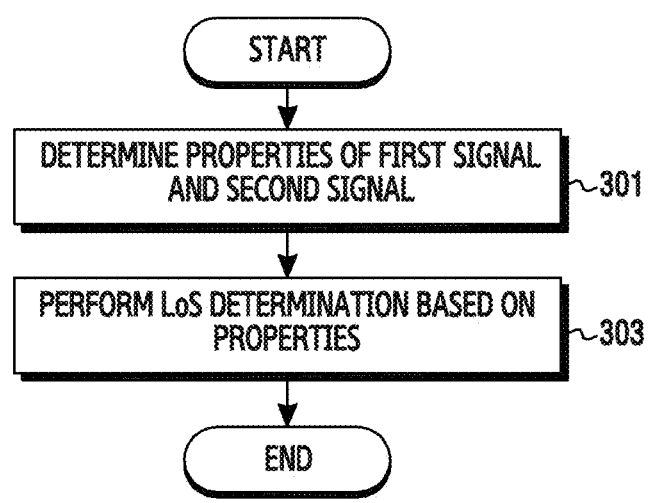
FIG. 3 is a flowchart illustrating that an electronic device performs line-of-sight (LoS) determination according to an embodiment of the present disclosure.

FIG. 3 is a flowchart illustrating an electronic device performing LoS determination according to an embodiment of the present disclosure. The electronic device 200 performing each operation of FIG. 3 may be referred to as a transmission device or reception device. The electronic device 200 may be one of a base station and a terminal.

Referring to FIG. 3, the electronic device 200 may determine properties of a first signal and a second signal in operation 301. Determining the properties of the first signal and the second signal includes the electronic device 200 receiving information on the properties of the first signal and the second signal from an external device (one of a transmission device and a reception device). The information on the properties may be received via a specific message. Further, determining the properties of the first signal and the second signal includes the electronic device 200 determining properties of the first signal and the second signal. Here, the first signal and the second signal may correspond to a high frequency signal and a low frequency signal, respectively. Specifically, the properties of the first signal and the second signal may include the strengths, traveling times, traveling distances, and traveling directions of the first signal and the second signal. The electronic device 200 may receive information necessary to determine the properties of the first signal and the second signal from a transmission device or reception device of the signals. For example, when the electronic device 200 is a reception device, the electronic device 200 may receive information on equivalent isotropically radiated power (EIRP) from a transmission device to measure the signal strengths. Further, the electronic device 200 may receive information on the times that the signals are sent from the transmission device in order to measure the traveling times of the signals. The electronic device 200 may also receive information on the absolute direction and the relative direction of a beam from the transmission device to determine the traveling directions of the signals. In addition, the electronic device 200 may receive information on an optimal beam direction from the transmission device. The electronic device 200 may measure the first signal and the second signal using the foregoing pieces of information. Although not shown in FIG. 3, the electronic device 200 may transmit or receive the first signal and the second signal prior to operation 301.

The electronic device 200 may perform LoS determination based on a result of determining the properties of the first signal and the second signal in operation 303. Specifically, the electronic device 200 may compare the strengths of the first signal and the second signal to perform LoS determination. For example, when a difference between the strengths of the first signal and the second signal is constant, the electronic device 200 may determine that the electronic device 200 is in LoS. When the difference between the strengths is not constant but is amplified, the electronic device 200 may determine that the electronic device 200 is in NLoS. Further, the electronic device 200 may compare distances determined based on the traveling times of the first signal and the second signal to perform LoS determination. For example, when the traveling times of the first signal and the second signal are the same or similar, the electronic device 200 may determine that the electronic device 200 is in LoS. On the contrary, when the traveling times are not similar, the electronic device 200 may determine that the electronic device 200 is in NLoS. In addition, the electronic device 200 may compare distances determined based on the strengths of the first signal and the second signal to perform LoS determination. For example, when the traveling distances of the first signal and the second signal that are determined based on the strengths are the same or similar, the electronic device 200 may determine that the electronic device 200 is in LoS. On the contrary, when the traveling distances are not similar, the electronic device 200 may determine that the electronic device 200 is in NLoS. Further, even though the traveling distances of the first signal and the second signal that are determined based on the times are the same or similar, the electronic device 200 may measure the traveling distances determined based on the signal strengths and may compare the traveling distances based on the times with the traveling distances based on the signal strengths to perform LoS determination. For example, when the traveling distances determined based on the traveling times of the signals are different from the traveling distances determined based on the signal strengths, the electronic device 200 may determine that the electronic device 200 is in NLoS. When the traveling distances determined based on the traveling times of the signals are the same as, or similar to, the traveling distances determined based on the signal strengths, the electronic device 200 may determine that the electronic device 200 is in LoS. Furthermore, the electronic device 200 may compare the optimal beam directions of the first signal and the second signal to perform LoS determination. For example, when the optimal beam directions of the first signal and the second signal are the same or similar, the electronic device 200 may determine that the electronic device 200 is in LoS. When the optimal beam directions of the first signal and the second signal are different, the electronic device 200 may determine that the electronic device 200 is in NLoS. In addition, the electronic device 200 may compare the horizontal and vertical directions of the signals to perform LoS determination. For example, when a horizontal condition and a vertical condition at a transmitting end and a receiving end are all satisfied, the electronic device 200 may determine that the electronic device 200 is in LoS. When at least one of the conditions is not satisfied, the electronic device 200 may determine that the electronic device 200 is in NLoS. In this case, the electronic device 200 may correspond to one of the transmitting end and the receiving end. In an embodiment, one of the first signal and the second signal may be omitted.

Figure 4A:
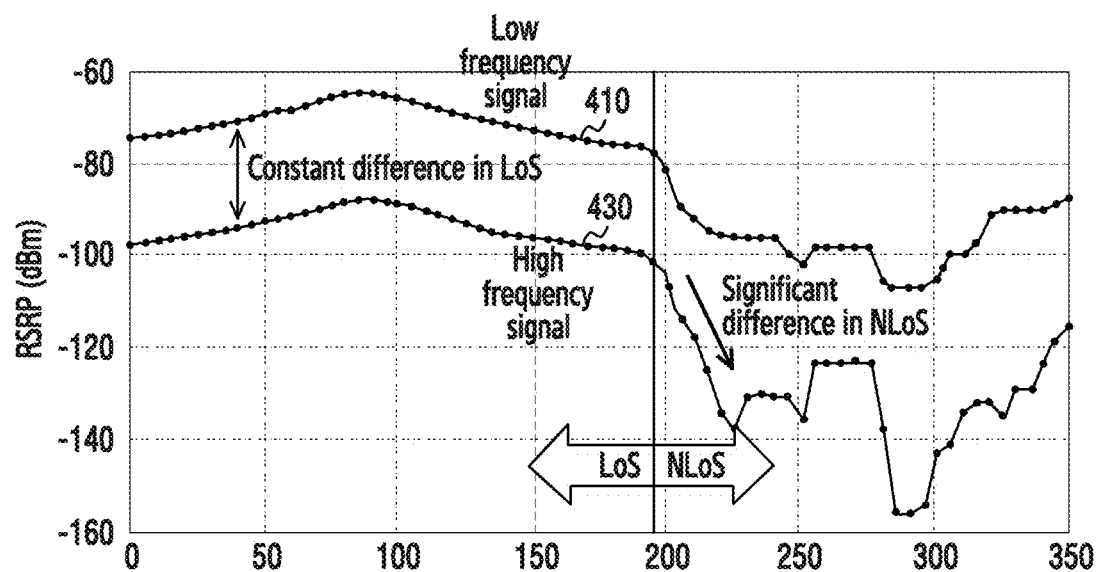
FIGS. 4A and 4B illustrate a method in which an electronic device performs LoS determination based on signal strength according to various embodiments of the present disclosure.
Figure 4B:
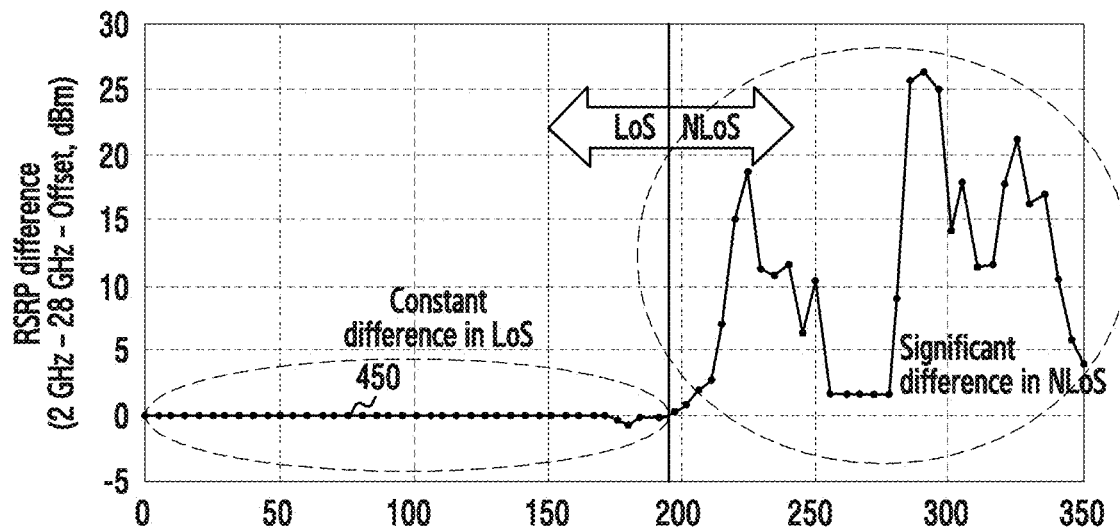

FIGS. 4A and 4B illustrate a method in which an electronic device performs LoS determination based on signal strength according to various embodiments of the present disclosure.

Referring to FIGS. 4A and 4B, the communication unit of the electronic device 200 may include RF chains for performing high frequency and low frequency communications. The electronic device 200 may be one of a transmission device and a reception device of a wireless signal.

The electronic device 200 may measure signal strength and may perform LoS determination based on a difference in signal strength. Specifically, the electronic device 200 may measure the signal strengths of a low frequency signal and a high frequency signal and may perform LoS determination based on a difference between the signal strengths. FIG. 4A illustrates the signal strength 410 of a low frequency signal and the signal strength 430 of a high frequency signal in LoS and NLoS, and FIG. 4B illustrates a signal strength difference 450 between the high frequency signal and the low frequency signal in LoS and NLoS. In FIG. 4A, the horizontal axis represents the position of the electronic device 200, and the vertical axis represents reference signal received power (RSRP). In FIG. 4B, the horizontal axis represents the position of the electronic device 200, and the vertical axis represents a difference in RSRP between the high frequency signal and the low frequency signal. It is assumed that the electronic device 200 travels with time in FIGS. 4A and 4B, and thus the horizontal axes in FIGS. 4A and 4B represent a change in the position of the electronic device 200 according to time. Referring to FIG. 4B, according to properties of a wireless signal, a difference in signal strength between a high frequency signal and a low frequency signal in LoS is generally constant. That is, even though the position of the electronic device 200 is changed, the difference in strength between the high frequency signal and the low frequency signal in LoS stays constant. However, a difference in signal strength between a high frequency signal and a low frequency signal in NLoS may be amplified due to the high straightness of the high frequency signal. That is, when the position of the electronic device 200 is changed, the extent to which the straightness of the high frequency signal is reduced may be changed in an NLoS, and thus the difference in strength between the high frequency signal and the low frequency signal may be changed. Based on such a characteristic, the electronic device 200 may perform LoS determination using Equation 1.

$$|(\text{EIRP}_{High}+G_{RX,High}-\text{RSRP}_{High})-(\text{EIRP}_{Low}+G_{RX,Low}-\text{RSRP}_{Low})-\text{Offset}|<\varepsilon \quad \text{Equation 1}$$

In Equation 1, $\text{EIRP}_{High}$ and $\text{EIRP}_{Low}$ represent the EIRPs of a high frequency and a low frequency, respectively. Further, in Equation 1, $G_{RX,High}$ and $G_{RX,Low}$ represent the gains of receiving antennas of a high frequency and a low frequency, and $\text{RSRP}_{High}$ and $\text{RSRP}_{Low}$ represent the RSRPs of a high frequency and a low frequency. Although RSRP according to an LTE communication method is used in Equation 1, a received signal strength indicator (RSSI) or a corresponding received signal strength measurement may also be used. $\varepsilon$ is a margin value used for a determination condition, which is an appropriate value selected in view of an error range. The electronic device 200 may receive a message including necessary information in order to perform LoS determination based on signal strength. Specific information included in the message is described in detail with reference to FIGS. 5A and 5B.

Figure 5A:
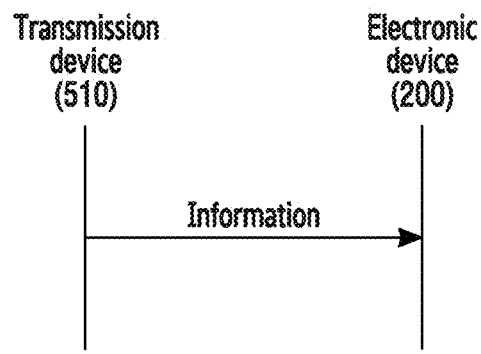
FIGS. 5A and 5B illustrate the flow of information for an electronic device to perform LoS determination based on signal strength according to various embodiments of the present disclosure.
Figure 5B:
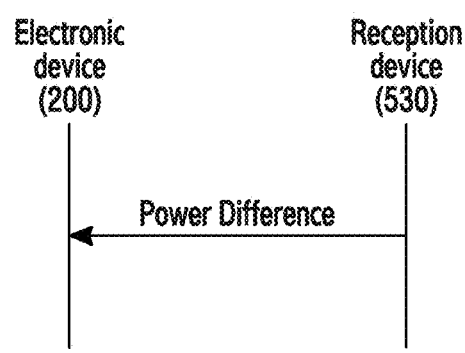

FIGS. 5A and 5B illustrate the flow of information for an electronic device to perform LoS determination based on signal strength according to various embodiments of the present disclosure. Specifically, FIG. 5A illustrates that the electronic device 200, which receives a reference signal, receives information for LoS determination from a transmission device 510 that transmits the reference signal. On the contrary, FIG. 5B illustrates that the electronic device 200, which transmits a reference signal, receives information for LoS determination from a reception device 530 that receives the reference signal.

Referring to FIG. 5A, the electronic device 200, which receives a reference signal of a high frequency signal and a reference signal of a low frequency signal from the transmission device 510, may receive a message including necessary information from the transmission device 510 to perform LoS determination based on signal strength. Specifically, the message may include at least one among the following pieces of information:

1) EIRP difference between frequencies ($\text{EIRP}_{High}-\text{EIRP}_{Low}$)
2) EIRP of each frequency ($\text{EIRP}_{High}$, $\text{EIRP}_{Low}$)
3) Transmission power ($P_{High}$, $P_{Low}$) and transmitting antenna gain ($G_{High}$, $G_{Low}$) of each frequency
4) Difference in transmission power ($P_{High}-P_{Low}$) and difference in transmitting antenna gain ($G_{High}-G_{Low}$) between frequencies
5) Quantized values of 1) to 4) by each section
6) Values obtained by processing 1) to 5)

The message may include approximate values for estimating the foregoing values, although not accurate values, quantized values, or indicators of specific values. When the electronic device 200 knows the transmitting antenna gain, transmission power, or EIRP in advance, the transmission device 510 may transmit a message including only some information that is not known to the electronic device 200. Further, the message may selectively include:

7) Offset value between frequencies
8) Information indicator indicating that the transmission device of the high frequency signal and the transmission device 510 of the low frequency signal are co-located.

The message including at least one of the foregoing pieces of information 1) to 6) may be transmitted by at least one of the transmission device 510 of the low frequency signal and the transmission device 510 of the high frequency signal. According to an embodiment, the transmission device 510 may be a base station, and the base station may include a communication unit for a high frequency signal and a communication unit for a low frequency signal. According to another embodiment, the transmission device 510 may include a transmission device of a high frequency signal and a transmission device of a low frequency signal, which are located in the geographically same place. The electronic device 200 may determine using some of the foregoing information whether the electronic device 200 is in LoS relative to the transmission device 510. In an embodiment, the information may have been input at implementation or may be received from other devices that have the information.

Referring to FIG. 5B, the electronic device 200, which transmits a reference signal of a high frequency signal and/or a reference signal of a low frequency signal to the reception device 530, may receive a message including necessary information from the reception device 530 to perform LoS determination. Specifically, the message may include at least one among:

1) RSRP difference ($RSRP_{High}-RSRP_{Low}$ or $RSRP_{Low}-RSRP_{High}$)
2) RSRP of each frequency ($RSRP_{High}$, $RSRP_{Low}$)
3) RSRP and RX Gain ($RSRP_{High}$, $RSRP_{Low}$, $G_{RX\ High}$, $G_{RX\ Low}$)
4) Quantized values of 1) to 3) by each section
5) Values obtained by processing 1) to 4)

That is, the message includes information on a difference in strength between the high frequency signal and the low frequency signal. The electronic device 200 may perform LoS determination based on the information included in the message.

Figure 6:
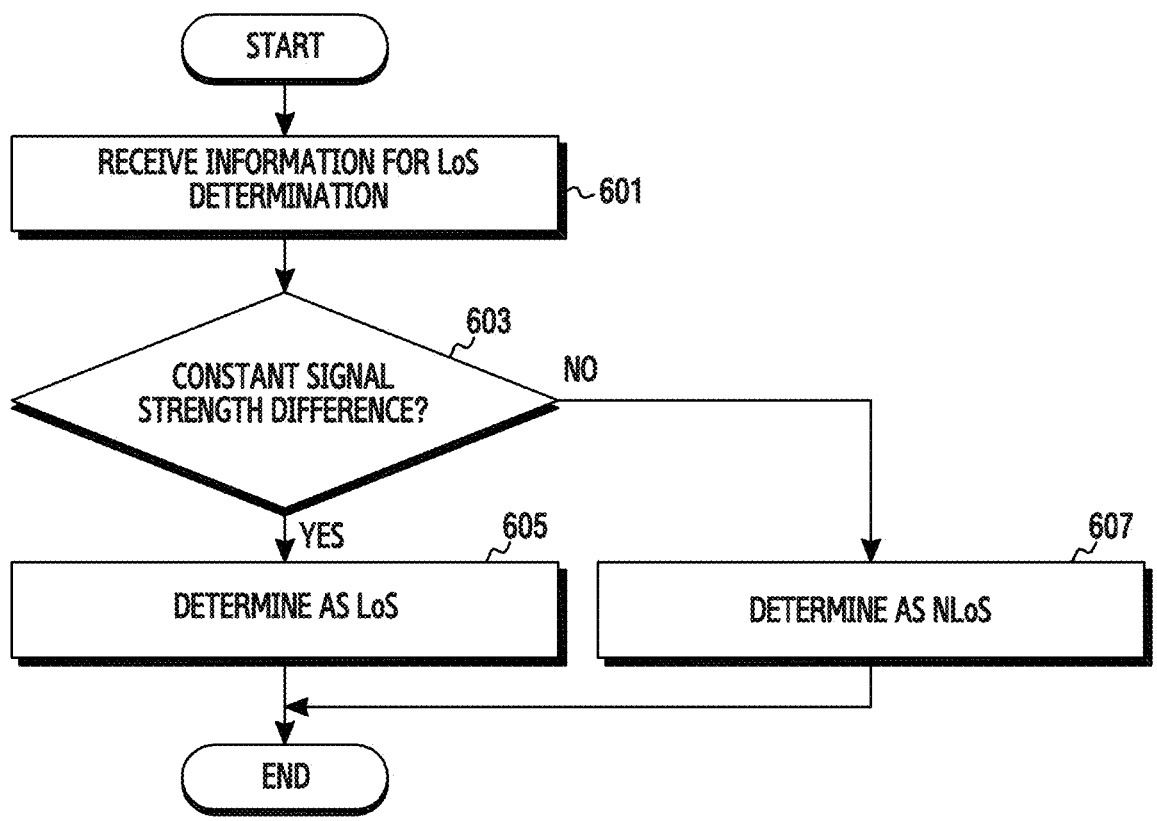
FIG. 6 is a flowchart illustrating that an electronic device performs LoS determination based on signal strength according to an embodiment of the present disclosure.

FIG. 6 is a flowchart illustrating a method by which an electronic device performs LoS determination based on signal strength according to an embodiment of the present disclosure. Each operation in FIG. 6 may be performed by the electronic device 200 that transmits a reference signal according to an embodiment. Alternatively, each operation in FIG. 6 may be performed by the electronic device 200 that receives a reference signal according to another embodiment.

Referring to FIG. 6, the electronic device 200 may receive information for LoS determination in operation 601. Specifically, the electronic device 200 may receive a message including information necessary for LoS determination. According to an embodiment, it may be assumed that the electronic device 200 receives a reference signal from a transmission device. In this case, the electronic device 200 may receive a message including information on the EIRP of each frequency from the transmission device, that is, at least one of a transmission device of a high frequency signal and a transmission device of a low frequency signal (the transmission device of the low frequency signal and the transmission device of the high frequency signal may be included in one device according to an embodiment). That is, the electronic device 200 may receive, from the transmission device, a message including at least one piece of information among:

1) EIRP difference between frequencies ($EIRP_{High}-EIRP_{Low}$)
2) EIRP of each frequency ($EIRP_{High}$, $EIRP_{Low}$)
3) Transmission power ($P_{High}$, $P_{Low}$) and transmitting antenna gain ($G_{High}$, $G_{Low}$) of each frequency
4) Difference in transmission power ($P_{High}-P_{Low}$) and difference in transmitting antenna gain ($G_{High}-G_{Low}$) between frequencies
5) Quantized values of 1) to 4) by each section
6) Values obtained by processing 1) to 5)

Further, the electronic device 200 may receive a message selectively further including:

7) Offset value between frequencies
8) Information indicator indicating that the transmission device of the high frequency signal and the transmission device of the low frequency signal are co-located.

According to another embodiment, it may be assumed that the electronic device 200 transmits a reference signal. In this case, the electronic device 200 may receive, from a reception device, a message including at least one among the following pieces of information:

1) RSRP difference ($RSRP_{High}-RSRP_{Low}$ or $RSRP_{Low}-RSRP_{High}$)
2) RSRP of each frequency ($RSRP_{High}$, $RSRP_{Low}$)
3) RSRP and RX Gain ($RSRP_{High}$, $RSRP_{Low}$, $G_{RX\ High}$, $G_{RX\ Low}$)
4) Quantized values of 1) to 3) by each section
5) Values obtained by processing 1) to 4)

That is, the message includes information on a difference in strength between the high frequency signal and the low frequency signal.

The electronic device 200 may determine whether a signal strength difference is constant in operation 603. Specifically, when the position of the electronic device 200 is changed with time, the electronic device 200 may determine whether a difference between the strength of the high frequency signal and the strength of the low frequency signal is constant. The position of the electronic device 200 may be changed according to movement, and the electronic device 200 may measure the strength of the high frequency signal and the strength of the low frequency signal at regular time intervals to determine whether the difference between the strengths is constant. When a LoS situation is maintained despite the positional change of the electronic device 200 according to movement, the difference between the strength of the high frequency signal and the strength of the low frequency signal, which are measured at regular time intervals, may stay constant. When the position of the electronic device 200 is changed according to movement to cause an NLoS situation, the difference between the strength of the high frequency signal and the strength of the low frequency signal, which are measured at regular time intervals, may not stay constant but may be amplified. Unlike in the LoS situation, the diffraction extents of the high frequency signal and the low frequency signal may change according to the movement of the electronic device 200 in the NLoS situation, and accordingly, the difference in strength between the received signals may be changed according to the movement of the electronic device 200. For example, when the electronic device 200 receives the reference signal, the electronic device 200 may determine whether the difference between the strength of the high frequency signal and the strength of the low frequency signal is constant based on the information included in the message received in operation 601 and the RSRP of each frequency determined by the electronic device 200. For another example, when the electronic device 200 transmits the reference signal, the electronic device 200 may determine whether the difference in strength between the received signals is constant using the information included in the message received in operation 601 and the information on the EIRP of each frequency that the electronic device 200 already knows. According to an embodiment, the electronic device 200 may determine through Equation 1 whether the signal strength difference is constant.

When it is determined that the received signal strength difference is constant, the electronic device 200 may perform operation 605. The electronic device 200 may determine that the electronic device 200 is in LoS in operation 605. That is, when the difference between the strength of the received high frequency signal and the strength of the received low frequency signal is constant, the electronic device 200 may determine that the electronic device 200 is in LoS, for which a wireless signal has a property such that a difference in signal strength between a high frequency signal and a low frequency signal in LoS is generally constant.

On the contrary, when it is determined that the received signal strength difference is not constant, the electronic device 200 may perform operation 607. That is, when the difference between the strength of the high frequency signal and the strength of the low frequency signal is not constant, the electronic device 200 may determine that the electronic device 200 is in NLoS, for which a difference in signal strength between a high frequency signal and a low frequency signal may be amplified due to a decrease in straightness of the high frequency signal in NLoS.

Figure 7:
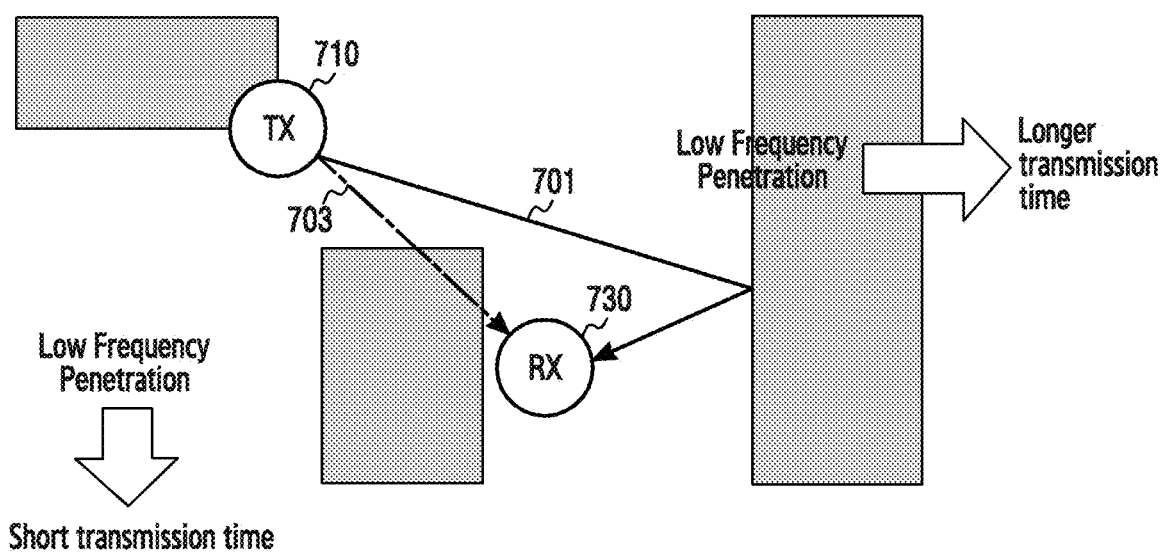
FIG. 7 illustrates a method in which an electronic device performs LoS determination based on a signal transmission time according to an embodiment of the present disclosure.

FIG. 7 illustrates a method in which an electronic device performs LoS determination based on signal transmission time according to an embodiment of the present disclosure.

Referring to FIG. 7, the electronic device 200 may be at least one of a transmission device 710 and a reception device 730. FIG. 7 illustrates that the transmission device 710 and the reception device 730 are in NLoS. In FIG. 7, a low frequency signal penetrates a building to be transmitted to the reception device 730 through a penetration path 703, while a high frequency signal is reflected on a neighboring building to be transmitted to the reception device 730 through a reflection path 701.

According to an embodiment, it may be assumed that the electronic device 200 for LoS determination is the reception device 730. The electronic device 200 (or the reception device 730) may receive a high frequency signal and a low frequency signal, which are transmitted from the transmission device 710, through the reflection path 701 and the penetration path 703, respectively. Referring to FIG. 7, since the low frequency signal achieves better penetration than the high frequency signal, the electronic device 200 (or the reception device 730) may receive the low frequency signal from the transmission device 710 through the penetration path 703. However, since the high frequency signal has difficulty in achieving penetration, the electronic device 200 (or the reception device 730) may receive the high frequency signal from the transmission device 710 through the reflection path 701. Accordingly, the transmission times of the high frequency signal and the low frequency signal, which are transmitted from the transmission device 710, may be different depending on different transmission paths.

The electronic device 200 (or the reception device 730) may determine and compare the transmission times of the high frequency signal and the low frequency signal to perform LoS determination. Specifically, according to an embodiment, when the high frequency signal and the low frequency signal are simultaneously transmitted and reach the electronic device 200 (or the reception device 730) at different times, the electronic device 200 (or the reception device 730) may determine that the electronic device 200 is in NLoS. On the contrary, the arrival times of the signals are the same or similar, the electronic device 200 (or the reception device 730) may determine that the electronic device 200 is in LoS. In this case, the electronic device 200 (or the reception device 730) may receive, from the transmission device 710, information indicating that the high frequency signal and the low frequency signal are simultaneously transmitted or may have such information according to a predetermined arrangement.

According to another embodiment, when the transmission start times of the high frequency signal and the low frequency signal are different, the electronic device 200 (or the reception device 730) may receive information on the transmission start times of the respective frequency signals from the transmission device 710 or may have such information according to a predetermined arrangement. The electronic device 200 (or the reception device 730) may determine the reception times of the high frequency signal and the low frequency signal, and may compare the reception times with the transmission start times to determine the total transmission times of the high frequency signal and the low frequency signal. When the total transmission times of the high frequency signal and the low frequency signal are different, the electronic device 200 (or the reception device 730) may determine that the electronic device 200 is in NLoS. On the contrary, when the total transmission times of the high frequency signal and the low frequency signal are the same or similar, the electronic device 200 (or the reception device 730) may determine that the electronic device 200 is in LoS.

According to another embodiment, it may be assumed that the electronic device 200 for LoS determination is the transmission device 710. The electronic device 200 (or the transmission device 710) may include communication units that transmit a high frequency signal and a low frequency signal, respectively. The electronic device 200 (or the transmission device 710) may be a base station device according to an embodiment.

The electronic device 200 (or the transmission device 710) may transmit the high frequency signal and the low frequency signal and may acquire reception time information on the high frequency signal and the low frequency signal from the reception device 730. Accordingly, the electronic device 200 (or the transmission device 710) may determine the total transmission times of the high frequency signal and the low frequency signal. When the total transmission times of the high frequency signal and the low frequency signal are different, the electronic device 200 (or the transmission device 710) may determine that the electronic device 200 is in NLoS. On the contrary, when the total transmission times of the high frequency signal and the low frequency signal are the same or similar, the electronic device 200 (or the transmission device 710) may determine that the electronic device 200 is in LoS.

There are various methods for measuring the traveling time of a wireless signal in a wireless communication system, and any traveling time measurement method may be used in the present disclosure. An LTE system may use Timing Advance (TA) information, in which case a LoS condition is represented by Equation 2.

$$|TA_{Low} - TA_{High}| < \varepsilon \qquad \text{Equation 2}$$

In Equation 2, $TA_{Low}$ and $TA_{High}$ represent TA at a low frequency and TA at a high frequency, respectively. $\varepsilon$ is a margin value used for a determination condition, which may be an appropriate value in view of an error range.

Figure 8:
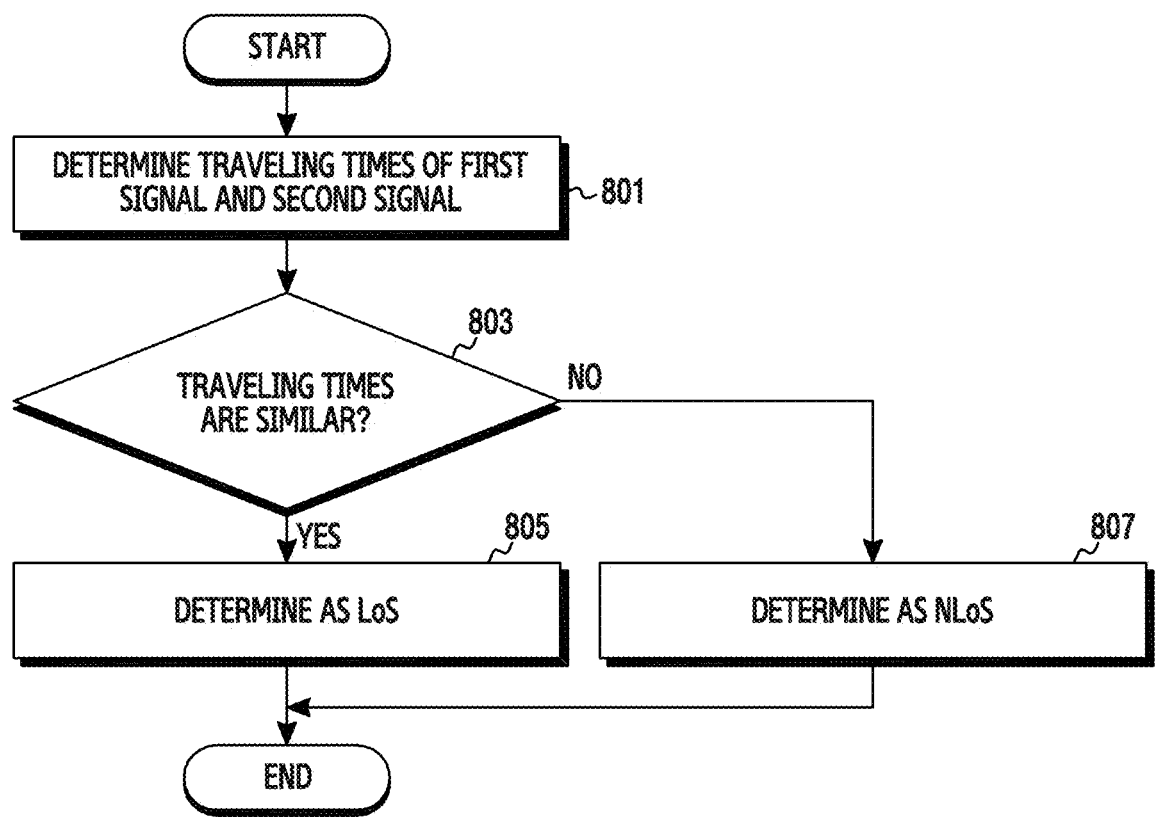
FIG. 8 is a flowchart illustrating that an electronic device performs LoS determination based on a signal traveling time according to an embodiment of the present disclosure.

FIG. 8 is a flowchart illustrating a method by which an electronic device performs LoS determination based on signal traveling time according to an embodiment of the present disclosure.

Referring to FIG. 8, the electronic device 200 may be at least one of a transmission device and a reception device. Signal traveling time may be referred to as signal transmission time.

The electronic device 200 may determine the traveling times of a first signal and a second signal in operation 801. Here, the first signal and the second signal may correspond to a high frequency signal and a low frequency signal, respectively. The electronic device 200 may determine the traveling times of the first signal and the second signal based on information on the transmission start times and the reception times of the first signal and the second signal. The electronic device 200 may receive necessary information to determine the traveling times of the first signal and the second signal. For example, when the electronic device 200 for LoS determination is a transmission device of the first signal and the second signal, the electronic device 200 may receive information on the reception times of the transmitted signals. For another example, when the electronic device 200 for LoS determination is a reception device of the first signal and the second signal, the electronic device 200 may receive information on the transmission start times. The electronic device 200 may determine the traveling times of the first signal and the second signal using the received information and information known to the electronic device 200 (for example, the transmission start times when the electronic device 200 is the transmission device).

The electronic device 200 may determine whether the traveling times are similar in operation 803. Specifically, the electronic device 200 may compare the traveling time of the first signal with the traveling time of the second signal to determine whether the traveling times are similar. For example, when the absolute value of a difference between the traveling time of the first signal and the traveling time of the second signal is less than a threshold (for example, $\varepsilon$), the electronic device 200 may determine that the traveling time of the first signal and the traveling time of the second signal are similar. The electronic device 200, when operating in an LTE system, may determine using Equation 2 whether the traveling time of the first signal and the traveling time of the second signal are similar according to an embodiment.

When it is determined that the traveling times of the first signal and the second signal are similar in an embodiment, the electronic device 200 may perform operation 805. The electronic device 200 may determine that the electronic device 200 is in LoS in operation 805. When it is determined that the traveling times of the first signal and the second signal are different in another embodiment, the electronic device 200 may perform operation 807. The electronic device 200 may determine that the electronic device 200 is in NLoS in operation 807.

Figure 9:
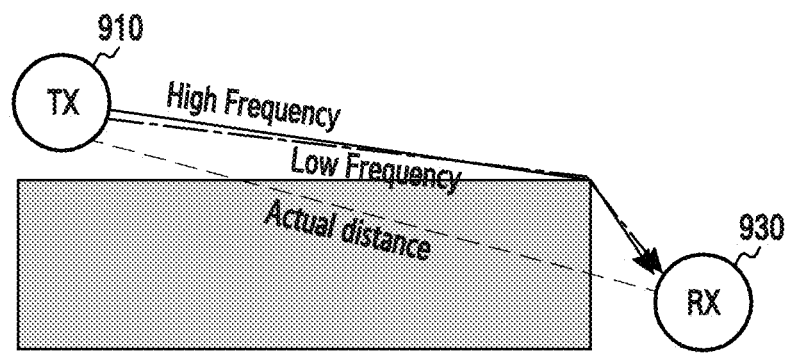
FIG. 9 illustrates a method in which an electronic device performs LoS determinations based on a transmitter-receiver distance that is estimated with a signal according to an embodiment of the present disclosure.

FIG. 9 illustrates a method in which an electronic device performs LoS determinations based on a transmitter-receiver distance that is estimated with a signal according to an embodiment of the present disclosure.

Referring to FIG. 9, the electronic device 200 may be at least one of a transmission device 910 and a reception device 930. FIG. 9 illustrates that the transmission device 910 and the reception device 930 are in NLoS.

First, the electronic device 200 may perform NLoS determination based on the transmission paths (or traveling paths) of a high frequency signal and a low frequency signal. In the foregoing embodiment, when the transmission paths of the high frequency signal and the low frequency signal are different, the electronic device 200 may determine that the electronic device 200 is in NLoS; and when the transmission paths are the same or similar, the electronic device 200 may determine that the electronic device 200 is in LoS. The electronic device 200 may determine whether traveling distances determined based on the transmission paths of the respective frequency signals are the same or similar. The electronic device 200 may estimate an actual transmitter-receiver distance according to the transmission paths based on information on the received frequency signals of the electronic device 200. It is difficult to ensure the accuracy of this estimated distance, particularly in an NLoS situation. Here, the electronic device 200 may determine a similarity between distances that are estimated with the received frequency signals. According to an embodiment, the electronic device 200 may perform LoS determination using Equation 3.

$$|dist_{Low} - dist_{high}| < \varepsilon \qquad \text{Equation 3}$$

In Equation 3, $dist_{Low}$ and $dist_{high}$ represent distances that are estimated with a low frequency signal and a high frequency signal, respectively. $\varepsilon$ is a margin value used for a determination condition, which may be an appropriate value in view of an error range. When Equation 3 is satisfied, the electronic device 200 generally determines that the electronic device 200 is in LoS.

Figure 10:
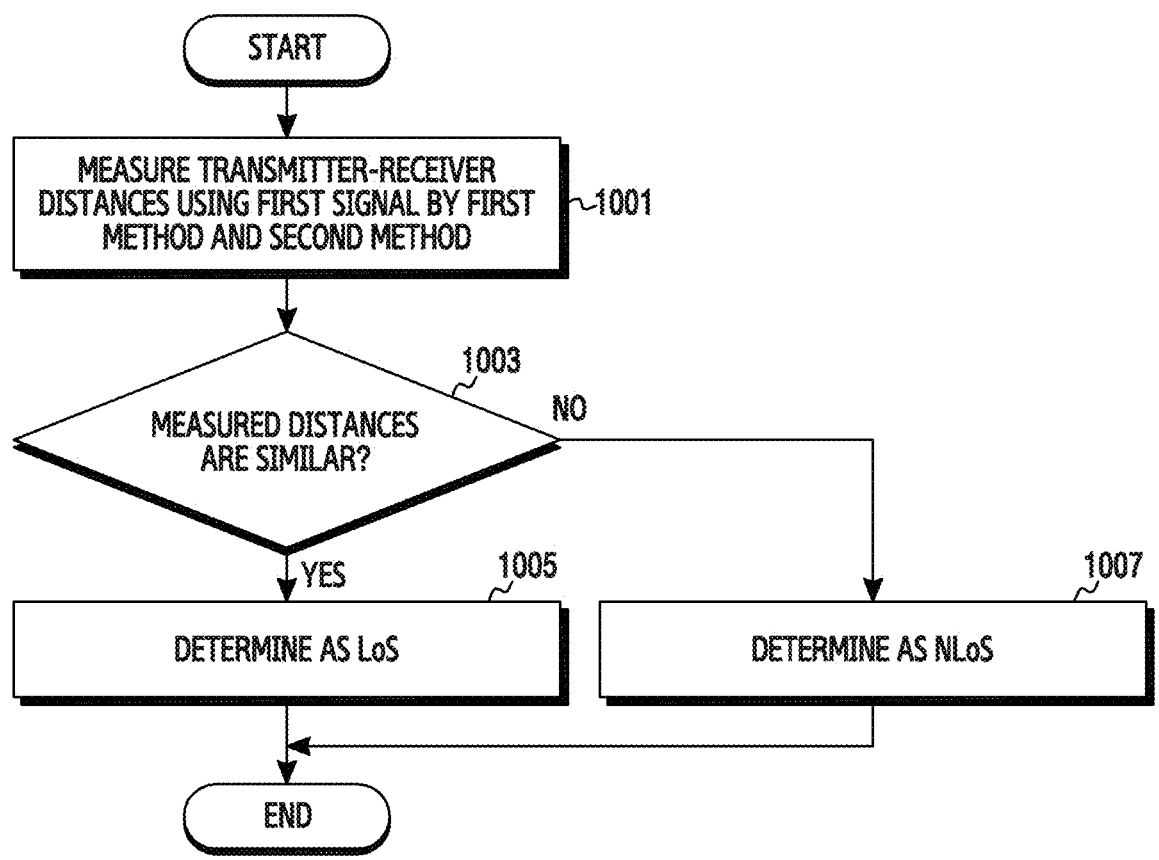
FIG. 10 is a flowchart illustrating a method in which an electronic device performs LoS determination by comparing distances that are measured using two methods according to an embodiment of the present disclosure.

FIG. 10 is a flowchart illustrating a method in which an electronic device performs LoS determination by comparing distances that are measured using two methods according to an embodiment of the present disclosure.

Unlike the foregoing embodiments, an embodiment of FIG. 10 discloses a LoS determination method using a signal in one frequency band. There are various methods for estimating a distance based on information on a received signal of a receiver according to an algorithm or at actual implementation. A representative example is a method using received signal strength or the traveling time of a radio wave. LoS determination may be performed by implementing distance estimation using a combination of various methods and comparing the estimation results. The electronic device 200 that performs each operation in FIG. 10 may be at least one of a transmission device and a reception device of the signal.

In operation 1001, the electronic device 200 may measure a transmitter-receiver distance using a first signal according to a first method and a second method. For example, the electronic device 200 may measure the distance based on the traveling time of the first signal according to the first method. The electronic device 200 may measure the transmitter-receiver distance using transmission time information and reception time information on the first signal. The electronic device 200 may have necessary information in advance to measure the distance based on the traveling time of the first signal, or may receive the necessary information from the counterpart device. The electronic device 200 may measure the distance based on the signal strength of the first signal according to the second method. The strength of the first signal measured by the receiver may be different in a LoS situation than in an NLoS situation. Generally, the strength of a received signal in the NLoS situation is greater than the strength of a received signal in the LoS situation.

In operation 1003, the electronic device 200 may determine whether the measured distances are similar. Specifically, the electronic device 200 may compare the distance measured by the first method with the distance measured by the second method to determine whether the distances are similar. For example, the electronic device 200 may determine whether the measured distances are similar using Equation 4.

$$|dist_{TA} - dist_{RSRP}| < \varepsilon \qquad \text{Equation 4}$$

$dist_{TA}$ and $dist_{RSRP}$ represent transmitter-receiver distances that are measured based on time (that is, transmission path) and signal strength, respectively. ε is a margin value used for a determination condition, which is an appropriate value in view of an error range. The electronic device 200 may compare $dist_{TA}$ of the first signal with $dist_{RSRP}$ of the first signal to determine whether the measured distances are similar.

When it is determined that the distances measured by the first method and the second method are similar, the electronic device 200 may determine that the electronic device 200 is in LoS in operation 1005. That is, in an LoS situation, there is generally no obstruction, for example, a building, in the transmission path of the first signal, and thus the distance measured based on the received signal strength and the distance determined based on the traveling time of the signal are similar.

When it is determined that the distances measured by the first method and the second method are not similar, the electronic device 200 may determine that the electronic device 200 is in NLoS in operation 1007. For example, in the NLoS situation where the first signal in the single frequency band is transmitted along the path illustrated in FIG. 9, the distance determined based on the traveling time of the first signal may be different from the distance determined based on the strength of the first signal.

Figure 11:
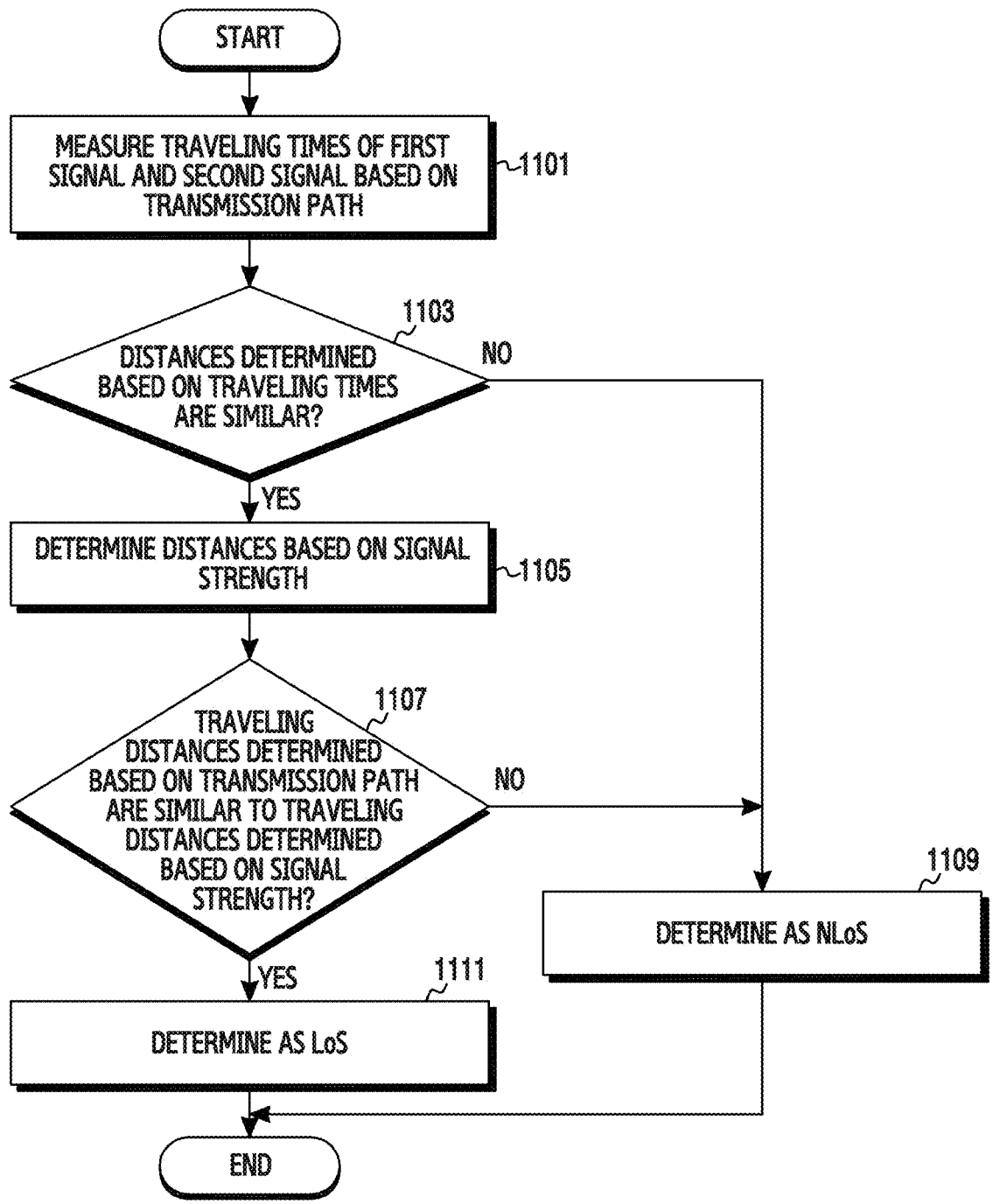
FIG. 11 is a flowchart illustrating a method in which an electronic device performs LoS determination using two distance measurement methods according to an embodiment of the present disclosure.

FIG. 11 is a flowchart illustrating a method in which an electronic device performs LoS determination using two distance measurement methods according to an embodiment of the present disclosure.

Unlike the embodiment of FIG. 10, an embodiment of FIG. 11 discloses a LoS determination method using signals in two frequency bands. The electronic device 200 that performs each operation in FIG. 11 may be at least one of a transmission device and a reception device of the signals.

In operation 1101, the electronic device 200 may measure the traveling times of a first signal and a second signal based on a transmission path. Here, the first signal and the second signal may correspond to a high frequency signal and a low frequency signal, respectively. Since a high frequency signal generally has higher straightness than a low frequency signal, the high frequency signal and the low frequency signal may have different transmission paths in the NLoS situation. For example, in the LoS situation, the traveling paths of the first signal and the second signal are the same, and accordingly the traveling times of the first signal and the second signal may be the same or similar. In the NLoS situation, however, the traveling paths of the first signal and the second signal are different, and accordingly the traveling times of the first signal and the second signal are different. That is, in the NLoS situation, the traveling time of the first signal may be greater than the traveling time of the second signal.

In operation 1103, the electronic device 200 may determine whether distances determined based on the traveling times are similar. For example, the electronic device 200 may determine, using Equation 3, whether the traveling distances of the first signal and the second signal are the same or similar. In an embodiment, when it is determined that the distances determined based on the traveling times of the first signal and the second signal are different, the electronic device 200 may determine that the electronic device 200 is in NLoS in operation 1109.

In another embodiment, when it is determined that the distances determined based on the traveling times of the first signal and the second signal are similar, the electronic device 200 may perform operation 1105. The electronic device 200 may determine a distance based on signal strength in operation 1105. The electronic device 200 may determine the traveling distances of the first signal and the second signal using received signal strength information on the first signal and received signal strength information on the second signal. For example, the electronic device 200 may determine the distances using RSRP and RSSI. When a signal is diffracted while traveling, diffraction loss may occur. In this case, the electronic device 200 may determine a traveling distance to be greater than an actual signal traveling distance.

In operation 1107, the electronic device 200 may determine whether the distances determined based on the traveling times and the distances determined based on the signal strengths are similar. For example, in the situation illustrated in FIG. 9, the transmission paths of the first signal and the second signal may be the same, and thus the traveling times thereof may be the same. However, each signal is diffracted while being transmitted, and accordingly diffraction loss occurs. Therefore, the distances determined based on the received signal strengths may be different from the distances determined based on the traveling times in operation 1101. The electronic device 200 may determine whether the distances determined based on the traveling times of the signals and the distances determined based on the signal strengths are similar to perform LoS determination. For example, the electronic device 200 may respectively compare the distances determined based on the traveling times of the first signal and the second signal with the distances determined based on the signal strengths of the first signal and the second signal to perform LoS determination. The electronic device 200 may determine, for example, using Equation 4, whether the traveling distances of the signals are similar.

According to an embodiment, when the distance determined based on the traveling time of the first signal (or second signal) is the same as, or similar to, the distance determined based on the signal strength of the first signal (or second signal), the electronic device 200 may determine that the electronic device 200 is in LoS in operation 1111. However, according to another embodiment, when the distance determined based on the traveling time of the first signal (or second signal) and the distance determined based on the signal strength of the first signal (or second signal) are different by a certain value or higher (that is, are not similar) the electronic device 200 may determine that the electronic device 200 is in NLoS in operation 1111.

Figure 12A:
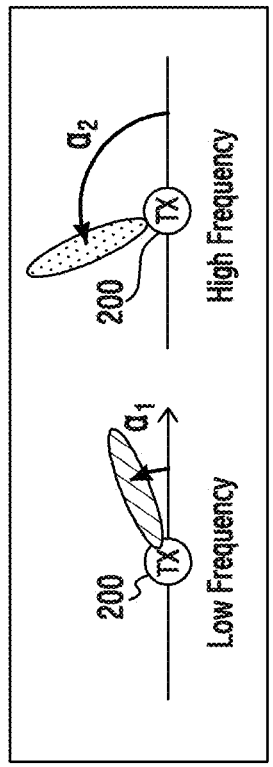
FIGS. 12A and 12B illustrate a method in which an electronic device performs LoS determination in view of an optimal beam direction according to various embodiments of the present disclosure.
Figure 12B:
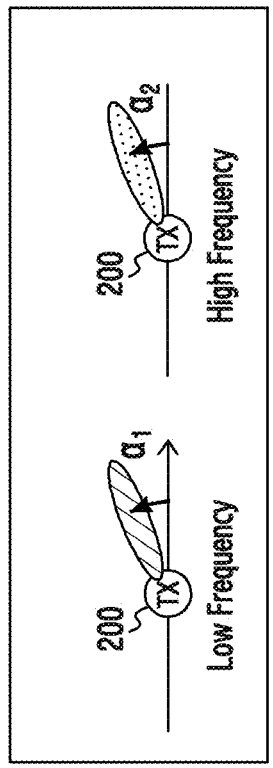

FIGS. 12A and 12B illustrate a method in which an electronic device performs LoS determination in view of an optimal beam direction according to various embodiments of the present disclosure.

Referring to FIGS. 12A and 12B, the electronic device 200 may include a communication unit that is capable of operating at a high frequency and a low frequency and may perform beamforming using the communication unit. In FIGS. 12A and 12B, the electronic device 200 may be a base station device. Further, the electronic device 200 may be referred to as a transmission device. An optimal beam direction may be referred to as a transmission direction or reception direction of a signal.

The electronic device 200 may perform LoS determination based on whether an optimal beam direction of a high frequency signal and an optimal beam direction of a low frequency signal are the same or similar. Specifically, FIG. 12A illustrates that the low frequency signal and the high frequency signal have the same optimal beam direction. Referring to FIG. 12A, the electronic device 200 (in this case, the transmission device) transmits an optimal beam of the low frequency signal in direction $\alpha_1$ and transmits an optimal beam of the high frequency signal in direction $\alpha_2$. In FIG. 12A, $\alpha_1$ and $\alpha_2$ are the same. In this case, the electronic device 200 may determine that the electronic device 200 is in LoS.

On the contrary, FIG. 12B illustrates that the low frequency signal and the high frequency signal have different optimal beam directions. Referring to FIG. 12B, the electronic device 200 (in this case, the transmission device) transmits an optimal beam of the low frequency signal in direction $\alpha_1$ and transmits an optimal beam of the high frequency signal in direction $\alpha_2$. In FIG. 12B, $\alpha_1$ and $\alpha_2$ are different. In this case, the electronic device 200 may determine that the electronic device 200 is in NLoS.

In an embodiment of FIGS. 12A and 12B, when the electronic device 200 is a transmission device (for example, a base station device), a reception device (for example, a terminal) of a signal is not necessarily required to perform a beamforming function. The electronic device 200 may obtain, from the reception device, a feedback on a result of measuring a reference signal for beamforming. The electronic device 200 may perform LoS determination based on feedback information and optimal beam direction information.

However, according to another embodiment, the electronic device 200 may be a reception device that receives an optimal beam of a high frequency signal and an optimal beam of a low frequency signal in FIGS. 12A and 12B. In this case, the electronic device 200 needs to be capable of performing a beamforming function. The electronic device 200 may determine that the electronic device 200 is in LoS when the high frequency signal and the low frequency signal have the same or similar optimal beam directions, and may determine that the electronic device 200 is in NLoS when the high frequency signal and the low frequency signal have different optimal beam directions.

In FIGS. 12A and 12B, the electronic device 200 performs LoS determination by comparing the optimal beam direction of the high frequency signal with the optimal beam direction of the low frequency signal. In another embodiment, however, the electronic device 200 may perform LoS determination by comparing $2^{nd}$ optimal beams, $3^{rd}$ optimal beams, $4^{th}$ optimal beams, and the like, instead of the optimal beams. For example, the electronic device 200 may perform LoS determination by comparing a $2^{nd}$ optimal beam direction of the low frequency signal with a $2^{nd}$ optimal beam direction of the high frequency signal. That is, when the $2^{nd}$ optimal beam direction of the low frequency signal is similar to the $2^{nd}$ optimal beam direction of the high frequency signal, the electronic device 200 may determine that the electronic device 200 is in LoS. When the $2^{nd}$ optimal beam direction of the low frequency signal is different from the $2^{nd}$ optimal beam direction of the high frequency signal, the electronic device 200 may determine that the electronic device 200 is in NLoS. Also, the electronic device 200 may perform LoS determination by comparing a $3^{rd}$ optimal beam direction of the high frequency signal and a $3^{rd}$ optimal beam direction of the low frequency signal.

Figure 13:
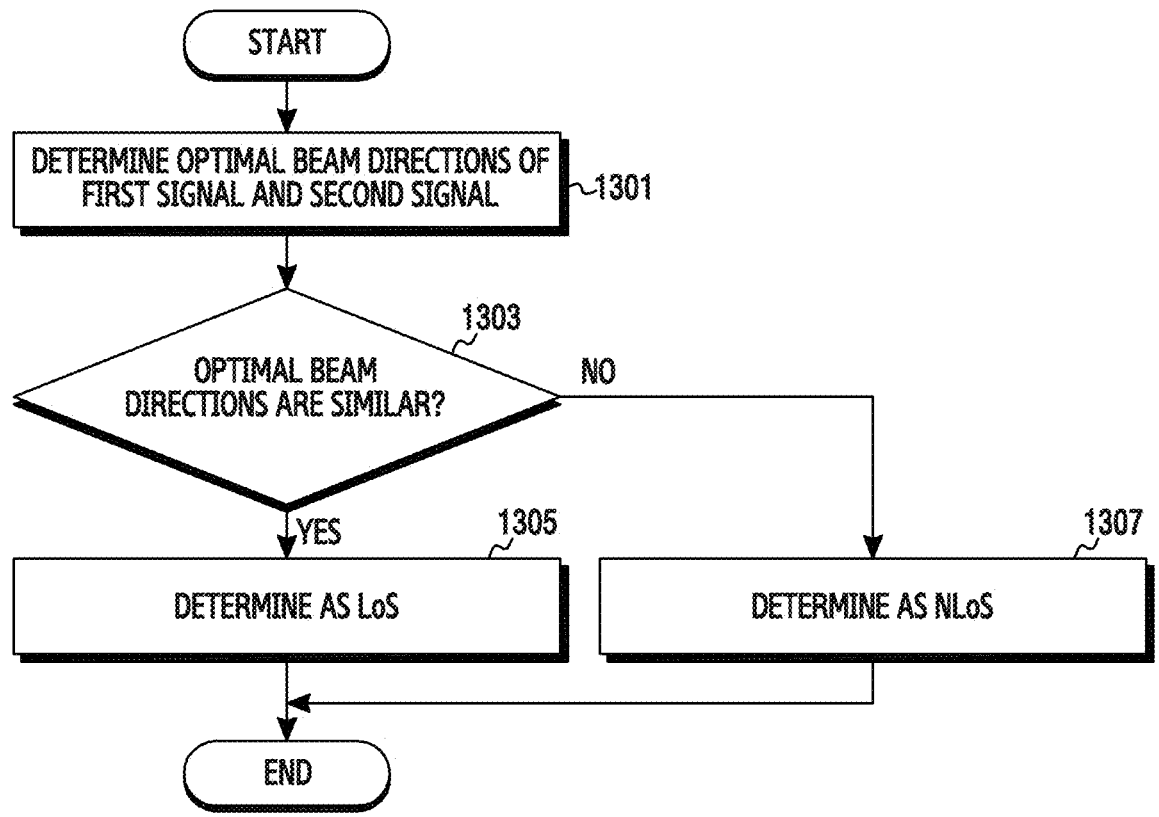
FIG. 13 is a flowchart illustrating a method in which an electronic device performs LoS determination in view of an optimal beam direction according to an embodiment of the present disclosure.

FIG. 13 is a flowchart illustrating a method in which an electronic device performs LoS determination in view of an optimal beam direction according to an embodiment of the present disclosure.

Referring to FIG. 13, the electronic device 200 may include a communication unit that is capable of operating at a high frequency and a low frequency and may perform beamforming using the communication unit. The electronic device 200 that performs each operation in FIG. 13 may be at least one of a transmission device and a reception device of a signal. Further, the electronic device 200 may be at least one of a base station device and a terminal device.

In operation 1301, the electronic device 200 may determine the optimal beam directions of a first signal and a second signal. Here, the first signal and the second signal respectively correspond to a high frequency signal and a low frequency signal according to the present disclosure.

In operation 1303, the electronic device 200 may determine whether the optimal beam directions are similar. That is, the electronic device 200 may determine whether the optimal beam direction of the high frequency signal is similar to the optimal beam direction of the low frequency signal. The electronic device 200 may compare the optimal beam direction of a transmitted high frequency signal with the optimal beam direction of a transmitted low frequency signal, or may compare the optimal beam direction of a received high frequency signal with the optimal beam direction of a received low frequency signal to determine a similarity between the optimal beam directions.

According to an embodiment, when it is determined that the first signal and the second signal have similar optimal beam directions, the electronic device 200 may determine that the electronic device 200 is in LoS in operation 1305. According to another embodiment, when it is determined that the first signal and the second signal have different optimal beam directions, the electronic device 200 may determine that the electronic device 200 is in NLoS in operation 1307.

In FIG. 13, the electronic device 200 performs LoS determination by comparing the optimal beam direction of the high frequency signal with the optimal beam direction of the low frequency signal. In another embodiment, however, the electronic device 200 may perform LoS determination by comparing $2^{nd}$ optimal beams, $3^{rd}$ optimal beams, $4^{th}$ optimal beams, and the like, instead of the optimal beams.

Figure 14A:
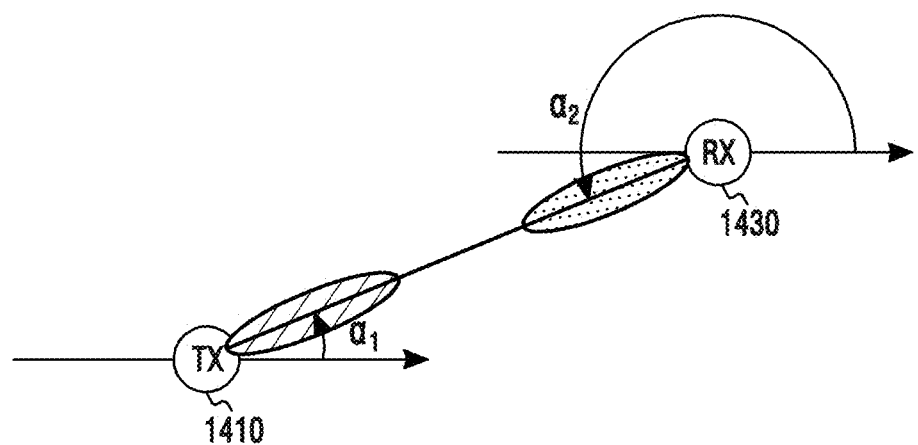
FIGS. 14A and 14B illustrate a method in which an electronic device performs LoS determination in view of a beam direction according to various embodiments of the present disclosure.
Figure 14B:
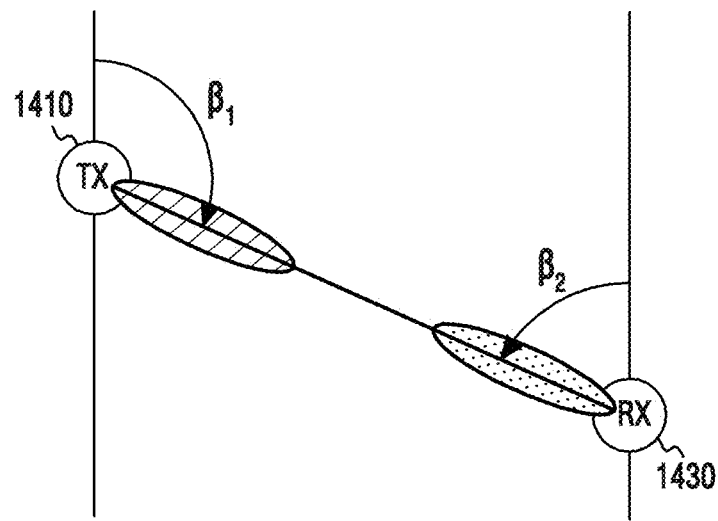

FIGS. 14A and 14B illustrate a method in which an electronic device performs LoS determination in view of a beam direction according to various embodiments of the present disclosure.

Referring to FIGS. 14A and 14B, it is assumed that both a transmission device and a reception device perform beamforming, and the electronic device 200 may be at least one of the transmission device and the reception device. In an embodiment illustrated in FIGS. 14A and 14B, unlike in the foregoing embodiment, the electronic device 200 may perform LoS determination using only communication in one frequency band. A beam direction may be referred to as a transmission direction or reception direction of a signal.

The electronic device 200 may perform LoS determination using the horizontal angles and the vertical angles of a transmitted beam and a received beam on absolute coordinate axes. FIG. 14A illustrates a condition related to the horizontal angles of the transmitted and received beams, and FIG. 14B illustrates a condition related to the vertical angles of the transmitted and received beams. Referring to FIG. 14A, when the horizontal angles of the transmission device 1410 and the reception device 1430 on an absolute coordinate axis are defined as $\alpha_1$ and $\alpha_2$, at and $\alpha_2$ need to satisfy Equation 5.

$$\text{Mod}(\alpha_1-\alpha_2, 360°)=180° \text{ or}$$

$$|\text{Mod}(\alpha_1-\alpha_2, 360°)-180°|<\varepsilon \qquad \text{Equation 5}$$

In Equation 5, $\alpha_1$ and $\alpha_2$ represent the horizontal angle of the transmission device and the horizontal angle of the reception device, respectively. In Equation 5, $\varepsilon$ is a margin value used for a determination condition, which may be an appropriate value in view of an error range.

Referring to FIG. 14B, when the vertical angles of the transmission device 1410 and the reception device 1430 on an absolute coordinate axis are defined as $\beta_1$ and $\beta_2$, $\beta_1$ and $\beta_2$ need to satisfy Equation 6.

$$\text{Mod}(\beta_1+\beta_2, 360°)=180° \text{ or}$$

$$|\text{Mod}(\beta_1+\beta_2, 360°)-180°|<\varepsilon \qquad \text{Equation 6}$$

In Equation 6, $\beta_1$ and $\beta_2$ represent the vertical angle of the transmission device and the vertical angle of the reception device, respectively. In Equation 6, $\varepsilon$ is a margin value used for a determination condition, which may be an appropriate value in view of an error range. In this case, since the vertical angles are determined using the angle of a beam, $\varepsilon$ may be a very small value that is close to 0. However, $\varepsilon$ may be several dB (for example, 2 to 4 dB) in some cases.

The electronic device 200 needs to know the direction of the transmitted beam or received beam on the absolute coordinate axes to determine whether a horizontal condition and a vertical condition of a signal are satisfied. For example, when the electronic device 200 corresponds to the transmission device 1410 and the transmission device 1410 is a base station device in an embodiment, the electronic device 200 needs to acquire information on the direction of a received beam on the absolute coordinate axes from the reception device 1430. For another example, when the electronic device 200 corresponds to the reception device 1430 and the reception device 1430 is a terminal device in an embodiment, the electronic device 200 needs to acquire information on the direction of a transmitted beam on the absolute coordinate axes from the transmission device 1410. In this case, the electronic device 200 may obtain information on the horizontal and vertical directions of the received beam using a geomagnetic sensor.

When both the horizontal condition of a signal in Equation 5 and the vertical condition of a signal in Equation 6 are satisfied, the electronic device 200 may determine that the electronic device 200 is in LoS. However, when at least one of the horizontal condition and the vertical condition of a received signal is not satisfied, the electronic device 200 may determine that the electronic device 200 is in NLoS.

Figure 15A:
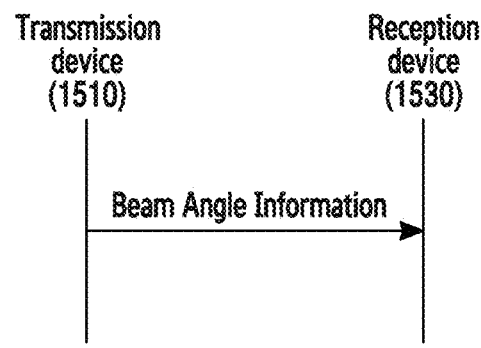
FIGS. 15A and 15B illustrate a method of transmitting absolute coordinate information on a beam according to various embodiments of the present disclosure.
Figure 15B:
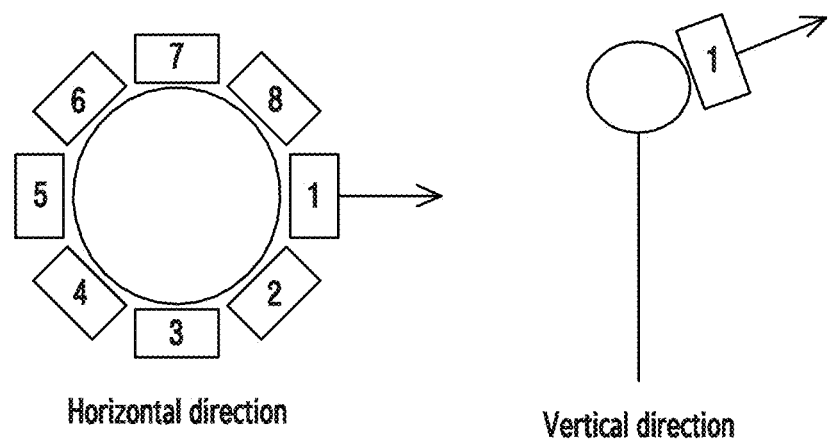

FIGS. 15A and 15B illustrate a method of transmitting absolute coordinate information on a beam according to various embodiments of the present disclosure.

Referring to FIGS. 15A and 15B, a transmission device 1510 may correspond to a base station device, and a reception device 1530 may correspond to a terminal device. Further, the electronic device 200 may be one of the transmission device 1510 and the reception device 1530. For description, it is assumed that the electronic device 200 corresponds to the reception device 1530 in FIG. 15A. However, the electronic device 200 may correspond to the transmission device 1510 in another embodiment.

The electronic device 200 (here, the reception device 1530) may know the beam index of a received signal but does not generally know the angle of a transmitted beam on an absolute coordinate axis. Therefore, the electronic device 200 needs to acquire information on the beam angle on the absolute coordinate axis from the base station device (or transmission device 1510). In an embodiment, the electronic device 200 may receive information on all beam directions listed in Table 1 from the base station device.

TABLE 1

| Beam # | Horizontal | Vertical |
|---|---|---|
| 1 | 0° | 95° |
| 2 | 10° | 95° |
| ... | ... | ... |
| N | 360° | 175° |

However, when the electronic device 200 receives the information on all beam directions in Table 1, the size of a message is relatively increased, thus being unfavorable for transmission efficiency.

According to another embodiment, the relative directions of beams from an antenna, which performs beamforming in the base station device, are predetermined according to a rule, the electronic device 200 may receive information on the direction of at least one beam from the base station device. The electronic device 200 may obtain the absolute directions of all beams from the received information on the direction of the at least one beam. In this case, information on the relative directions may be known in advance to the electronic device 200 or may be known by the electronic device 200 receiving information on an antenna direction pattern from the transmission device 1510.

Referring to FIG. 15B, the electronic device 200 may receive information on the absolute direction of a first beam and information on the relative direction of the first beam, that is, information on an antenna array pattern, to perform LoS determination. In this case, the electronic device 200 may receive the information on the absolute direction with respect to the horizontal direction and the vertical direction of the first beam from the transmission device 1510. In this case, the size of a message received by the electronic device 200 may be relatively reduced, thus being favorable for communication efficiency as compared with when the information on all beam directions is received. The electronic device 200 may include a geomagnetic sensor and may acquire horizontal information and vertical information on a received beam using the geomagnetic sensor. The electronic device 200 may compare horizontal information and vertical information on a beam transmitted from a base station with horizontal information and vertical information on a beam received by the electronic device 200 to perform LoS determination. In this case, the electronic device 200 may perform LoS determination using Equation 5 and Equation 6 in an embodiment.

Beam direction information may be expressed in a plurality of bits according to a quantization level. Table 2 below illustrates beam direction information expressed in a plurality of bits.

TABLE 2

| Azimuth Beam Info | Elevation Beam Info |
|---|---|
| 9 bits | 8 bits |

Table 2 illustrates that a horizontal angle is expressed in 9 bits and a vertical angle is expressed in 8 bits, assuming that a quantization level of horizontal and vertical beam angles is 1 degree.

Further, the electronic device 200 may correspond to the transmission device 1510 in the embodiment of FIG. 15A, in which case the electronic device 200 may receive information on the angle of a received beam from a reception device to perform LoS determination. In this case, the electronic device 200 may be a base station device in an embodiment.

FIGS. 16A, 16B, 16C, and 16D illustrate a procedure in which the electronic device performs LoS determination according to various embodiments of the present disclosure.

FIGS. 16A to 16D illustrate a mobile communication network including a base station 1610 and a terminal 1630. However, the present disclosure may also be applied to a general transmission device and a general reception device that support wireless communication. Although not shown in FIGS. 16A to 16D, the base station 1610 and the terminal 1630 may include a communication unit to transmit and receive a low frequency signal and a high frequency signal. The communication unit may include a first communication unit for a high frequency signal and a second communication unit for a low frequency signal, which are separate. The electronic device 200 for performing LoS determination may be one of the base station 1610 and the terminal 1630 in FIGS. 16A to 16D.

Figure 16A:
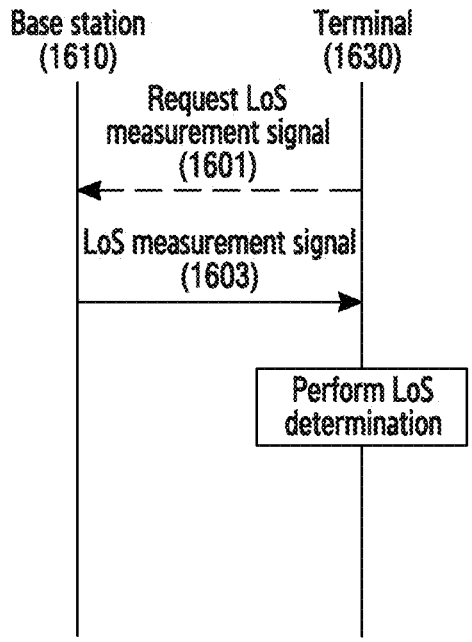
FIGS. 16A, 16B, 16C, and 16D illustrate a procedure in which an electronic device performs LoS determination according to various embodiments of the present disclosure.

FIG. 16A illustrates a first embodiment in which the electronic device 200 performs LoS determination. In FIG. 16A, the electronic device 200 may correspond to the terminal 1630. When a measurement signal for LoS determination is needed, the terminal 1630 may perform an operation 1601 of requesting a measurement signal for LoS determination from the base station 1610. However, when the base station 1610 may transmit a LoS measurement signal without a measurement signal request, the operation 1601 of requesting the measurement signal may be omitted. The base station 1610 may perform an operation 1603 of transmitting a downlink measurement signal to the terminal 1630, and the terminal 1630 may perform LoS determination based on the downlink measurement signal.

Figure 16B:
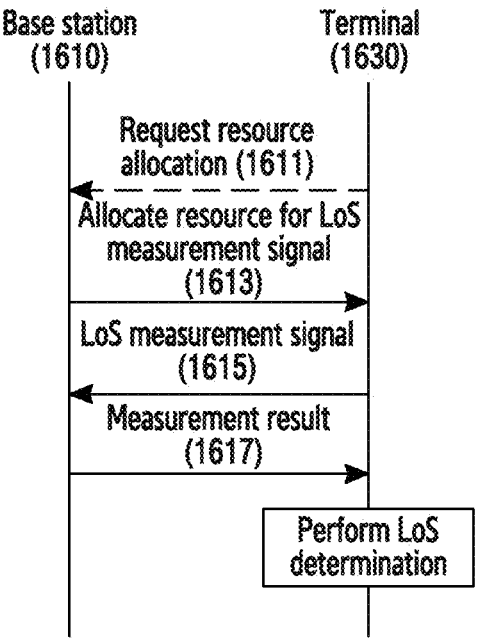

FIG. 16B illustrates a second embodiment in which the electronic device 200 performs LoS determination. In FIG. 16B, the electronic device 200 may correspond to the terminal 1630. When a measurement signal for LoS determination is needed, the terminal 1630 may perform an operation 1611 of requesting the base station 1610 to allocate a resource for transmitting a measurement signal for LoS determination. However, when the base station 1610 performs a resource allocation operation 1613 for a LoS measurement signal without the resource allocation request operation 1611, the resource allocation request operation 1611 may be omitted. The base station 1610 may perform the operation 1613 of allocating a radio resource for an uplink measurement signal in order to use the uplink measurement signal. After resource allocation, the terminal 1630 may perform an operation 1615 of transmitting a LoS measurement signal to the base station 1610, and the base station 1610 may perform an operation 1617 of reporting a measurement result. Next, the terminal 1630 may perform LoS determination based on the received measurement result.

Figure 16C:
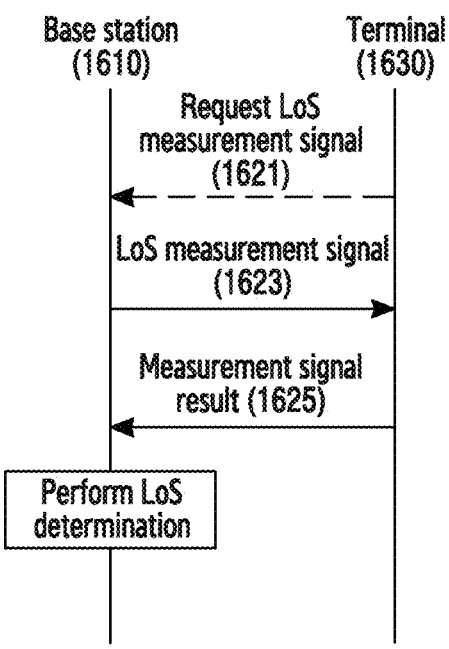

FIG. 16C illustrates a third embodiment in which the electronic device 200 performs LoS determination. In FIG. 16C, the electronic device 200 may correspond to the base station 1610.

When a measurement signal for LoS determination is needed, the terminal 1630 may perform an operation 1621 of requesting a measurement signal for LoS determination from the base station 1610. However, when the base station 1610 may transmit a LoS measurement signal without the operation 1621 of requesting the measurement signal, the operation 1621 of requesting the measurement signal may be omitted. The base station 1610 may perform an operation 1623 of transmitting a downlink measurement signal to the terminal 1630, and the terminal 1630 may perform an operation 1625 of transmitting a result of receiving the measurement signal to the base station 1610. The base station 1610 may perform LoS determination based on the received measurement result.

Figure 16D:
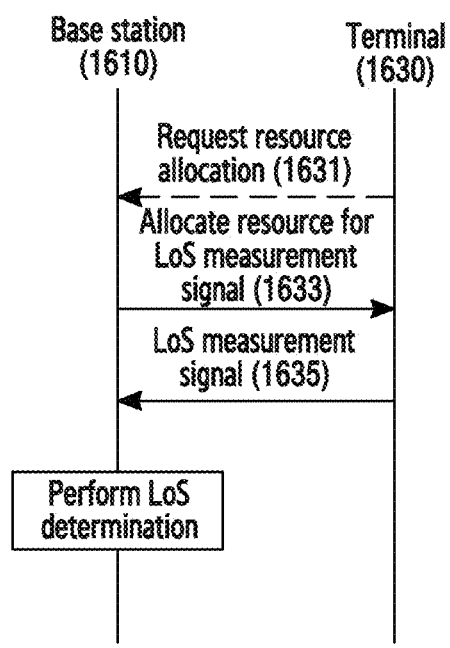

FIG. 16D illustrates a fourth embodiment in which the electronic device 200 performs LoS determination. In FIG. 16D, the electronic device 200 may correspond to the base station 1610. When a measurement signal for LoS determination is needed, the terminal 1630 may perform an operation 1631 of requesting the base station 1610 to allocate a resource for transmitting a measurement signal for LoS determination. However, when the base station 1610 performs a resource allocation operation 1633 for a LoS measurement signal without the resource allocation request operation 1631, the resource allocation request operation 1631 may be omitted. The base station 1610 may perform the operation 1633 of allocating a radio resource for an uplink measurement signal in order to use the uplink measurement signal. After resource allocation, the terminal 1630 may perform an operation 1635 of transmitting a LoS measurement signal to the base station 1610. The base station 1610 may receive and measure the LoS measurement signal to perform LoS determination.

In the present disclosure, one LoS determination method may be used or two or more LoS determination methods may be used in combination.

Methods stated in claims and/or specifications according to various embodiments may be implemented by hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the present disclosure as defined by the appended claims and/or disclosed herein.

The programs (software modules or software) may be stored in nonvolatile memories including a random access memory and a flash memory, a read only memory (ROM), an electrically erasable programmable ROM (EEPROM), a magnetic disc storage device, a compact disc-ROM (CD-ROM), digital versatile discs (DVDs), or other type optical storage devices, or a magnetic cassette. Alternatively, any combination of some or all of the may form a memory in which the program is stored. Further, a plurality of such memories may be included in the electronic device.

In addition, the programs may be stored in an attachable storage device which may access the electronic device through communication networks such as the Internet, Intranet, LAN, wide LAN (WLAN), and storage area network (SAN) or a combination thereof. Such a storage device may access the electronic device via an external port. Further, a separate storage device on the communication network may access a portable electronic device.

In the above-described detailed embodiments of the present disclosure, a component included in the present disclosure is expressed in the singular or the plural according to a presented detailed embodiment. However, the singular form or plural form is selected for convenience of description suitable for the presented situation, and various embodiments of the present disclosure are not limited to a single element or multiple elements thereof. Further, either multiple elements expressed in the description may be configured into a single element or a single element in the description may be configured into multiple elements.

While the present disclosure has been shown and described with reference to various embodiments thereof, it will be understood by those skilled in the art that various changes in forms and details may be made therein without departing from the spirit and scope of the present disclosure as defined by the appended claims and their equivalents.

What is claimed is:

1. A method for operating a first electronic device, the method comprising:
   receiving, by the first electronic device, a message including information, from a second electronic device;
   determining, by the first electronic device, properties of a first signal and a second signal that are received through different frequency bands from the second electronic device based on the information; and
   performing, by the first electronic device, line-of-sight (LoS) determination by comparing the properties of the first signal and the second signal,
   wherein the information includes at least one parameter for a transmission power of the first signal and a transmission power of the second signal, and
   wherein the at least one parameter is used by the first electronic device for determining the properties of the first signal and the second signal.

2. The method of claim 1, wherein the determining of the properties of the first signal and the second signal comprises measuring the properties of the first signal and the second signal.

3. The method of claim 1, wherein the properties of the first signal and the second signal comprise at least one of strengths, transmission times, transmission distances, or transmission directions of the first signal and the second signal.

4. The method of claim 1, wherein the performing of the LoS determination based on the properties comprises:
   determining strength of the first signal and strength of the second signal; and
   comparing the strength of the first signal with the strength of the second signal to perform the LoS determination.

5. The method of claim 1, wherein the performing of the LoS determination based on the properties comprises:
   determining transmission time of the first signal and transmission time of the second signal; and
   comparing the transmission time of the first signal with the transmission time of the second signal to perform the LoS determination.

6. The method of claim 1, wherein the performing of the LoS determination based on the properties comprises:
   determining transmission distance of the first signal and transmission distance of the second signal based on transmission time; and
   comparing the transmission distance of the first signal and the transmission distance of the second signal, which are determined based on the transmission time, to perform the LoS determination.

7. The method of claim 6, further comprising:
   determining transmission distance of the first signal and transmission distance of the second signal based on signal strength; and
   comparing the transmission distance of the first signal or the transmission distance of the second signal, which is determined based on the transmission time, with the transmission distance of the first signal or the transmission distance of the second signal, which is determined based on the signal strength, to perform the LoS determination.

8. The method of claim 1, wherein the performing of the LoS determination based on the properties comprises:
   determining an optimal beam direction of the first signal and an optimal beam direction of the second signal; and
   comparing the optimal beam direction of the first signal with the optimal beam direction of the second signal to perform the LoS determination.

9. The method of claim 1, wherein the performing of the LoS determination comprises:
   identifying a transmission time and power of the first signal and a transmission time and power of the second signal;
   identifying transmission distance of the first signal and the second signal based on the identified transmission time and power of the first signal and the second signal; and
   comparing the transmission distance of first signal and the second signal.

10. A first electronic device comprising:
    a wireless communication transceiver; and
    at least one processor configured to:
       control the wireless communication transceiver to receive a message including information from a second electronic device,
       determine properties of a first signal and a second signal that are received through different frequency bands from the second electronic device based on the information, and
       perform line-of-sight (LoS) determination by comparing the properties of the first signal and the second signal,
    wherein the information includes at least one parameter for a transmission power of the first signal and a transmission power of the second signal, and
    wherein the at least one parameter is used by the first electronic device for determining the properties of the first signal and the second signal.

11. The first electronic device of claim 10, wherein the at least one processor is further configured to measure the properties of the first signal and the second signal.

12. The first electronic device of claim 10, wherein the properties of the first signal and the second signal comprise at least one of strengths, transmission times, transmission distances, or transmission directions of the first signal and the second signal.

13. The first electronic device of claim 10, wherein the at least one processor is further configured to:
    determine strength of the first signal and strength of the second signal, and
    compare the strength of the first signal with the strength of the second signal to perform the LoS determination.

14. The first electronic device of claim 10, wherein the at least one processor is further configured to:
    determine transmission time of the first signal and transmission time of the second signal, and
    compare the transmission time of the first signal with the transmission time of the second signal to perform the LoS determination.

15. The first electronic device of claim 10, wherein the at least one processor is further configured to:
    determine transmission distance of the first signal and transmission distance of the second signal based on transmission time, and
    compare the transmission distance of the first signal with the transmission distance of the second signal to perform the LoS determination.

16. The first electronic device of claim 15, wherein the at least one processor is further configured to:

determine transmission distance of the first signal and transmission distance of the second signal based on signal strength, and compare the transmission distance of the first signal or the transmission distance of the second signal, which is determined based on the transmission time, with the transmission distance of the first signal or the transmission distance of the second signal, which is determined based on the signal strength, to perform the LoS determination.

17. The first electronic device of claim 10, wherein the at least one processor is further configured to:

determine an optimal beam direction of the first signal and an optimal beam direction of the second signal, and compare the optimal beam direction of the first signal with the optimal beam direction of the second signal to perform the LoS determination.

\* \* \* \* \*